(12) United States Patent
Goh et al.

(10) Patent No.: US 12,433,843 B2
(45) Date of Patent: Oct. 7, 2025

(54) BIOMOLECULAR COMPOSITES COMPRISING MODIFIED CELL GHOSTS

(71) Applicant: National University of Singapore, Singapore (SG)

(72) Inventors: Wei Jiang Goh, Singapore (SG); Giorgia Pastorin, Singapore (SG); Shui Zou, Singapore (SG)

(73) Assignee: National University of Singapore, Singapore (SG)

( * ) Notice: Subject to any disclaimer, the term of this patent is extended or adjusted under 35 U.S.C. 154(b) by 385 days.

(21) Appl. No.: 16/634,651

(22) PCT Filed: Jul. 27, 2018

(86) PCT No.: PCT/SG2018/050376
§ 371 (c)(1),
(2) Date: Jan. 28, 2020

(87) PCT Pub. No.: WO2019/022671
PCT Pub. Date: Jan. 31, 2019

(65) Prior Publication Data
US 2021/0085615 A1    Mar. 25, 2021

(30) Foreign Application Priority Data

Jul. 28, 2017    (SG) .............................. 10201706173U

(51) Int. Cl.
*A61K 9/50* (2006.01)
*A61K 9/107* (2006.01)
(Continued)

(52) U.S. Cl.
CPC .......... *A61K 9/5068* (2013.01); *A61K 9/1075* (2013.01); *A61K 9/1271* (2013.01);
(Continued)

(58) Field of Classification Search
CPC .................................................... A61K 9/5068
See application file for complete search history.

(56) References Cited

U.S. PATENT DOCUMENTS

| | | | | |
|---|---|---|---|---|
| 5,653,999 A | * | 8/1997 | Gaudreault | .......... A61K 9/5068 424/450 |
| 2005/0074506 A1 | * | 4/2005 | Natan | ................ A61K 41/0028 604/20 |

(Continued)

FOREIGN PATENT DOCUMENTS

| | | |
|---|---|---|
| CN | 108066317 A | 5/2018 |
| JP | 2014185090 A * | 10/2014 |

(Continued)

OTHER PUBLICATIONS

Ronnie H. Fang et al. "Lipid-insertion enables targeting functionalization of erythrocyte membrane-cloaked nanoparticles." Nanoscale, vol. 5, 2013, pp. 8884-8888. (Year: 2013).*

(Continued)

*Primary Examiner* — Isaac Shomer
(74) *Attorney, Agent, or Firm* — Osha Bergman Watanabe & Burton LLP

(57) ABSTRACT

The present invention provides a biomolecular composite which is a ghost cell which has been emptied of all or substantially all of the cytosolic contents of the cell including the nucleus and nuclear contents, preferably further having been fused with exogenous amphipathic molecules, wherein said composite has a hydrodynamic diameter of less than 6 μm. The biomolecular composite may contain a cargo molecule and be capable of targeting a cell or tissue. Also provided are methods of preparing ghost cells, methods of preparing biomolecular composites and methods for their use.

15 Claims, 15 Drawing Sheets

(51) Int. Cl.
*A61K 9/1271* (2025.01)
*A61K 9/1278* (2025.01)
*C12N 5/0786* (2010.01)

(52) U.S. Cl.
CPC .......... *A61K 9/1278* (2013.01); *C12N 5/0645* (2013.01); *C12N 2509/10* (2013.01); *C12N 2527/00* (2013.01)

(56) References Cited

U.S. PATENT DOCUMENTS

| | | | | |
|---|---|---|---|---|
| 2011/0014251 | A1* | 1/2011 | Ray | A61P 19/08 424/400 |
| 2012/0164214 | A1* | 6/2012 | Machluf | C12N 15/88 977/773 |
| 2012/0189630 | A1* | 7/2012 | Bigner | C07K 16/2809 435/69.6 |
| 2013/0337066 | A1* | 12/2013 | Zhang | A61P 35/00 424/234.1 |
| 2014/0315238 | A1* | 10/2014 | Farrell | G01N 15/147 435/29 |
| 2015/0266966 | A1* | 9/2015 | Smith | A61P 17/00 530/387.3 |

FOREIGN PATENT DOCUMENTS

| | | | | |
|---|---|---|---|---|
| WO | 01/54672 | A2 | 8/2001 | |
| WO | 2011/024172 | A2 | 3/2011 | |
| WO | 2015110957 | A2 | 7/2015 | |
| WO | WO-2016201323 | A1 * | 12/2016 | A23C 19/0904 |
| WO | WO-2017044940 | A1 * | 3/2017 | A61K 35/28 |
| WO | 2017/172769 | A1 | 10/2017 | |

OTHER PUBLICATIONS

Róbert Deák, Judith Mihály, Imola Cs. Szigyártó, András Wacha, Gábor Lelkes, and Attila Bota. "Physicochemical characterization of artificial nanoerythrosomes derived from erythrocyte ghost membranes." Colloids and Surfaces B: Biointerfaces, vol. 135, pp. 225-234 and 5 pp of supplementary info. (Year: 2015).*

Ronnie H. Fang et al. "Lipid-insertion enables targeting functionalization of erythrocyte membrane-cloaked nanoparticles." Nanoscale, vol. 5, 2013, pp. 8884-8888 and pp. 1-8 of supplementary information. (Year: 2013).*

Yuko T. Sato et al. "Engineering hybrid exosomes by membrane fusion with liposomes." Scientific Reports, 6:21933, published Feb. 25, 2016, pp. 1-11. (Year: 2016).*

English Translation of JP 2014185090 A. Clarivate Analytics. Translation Obtained in 2022, originally published in Japanese on Oct. 2, 2014, 11 printed pages. (Year: 2014).*

Elena V. Batrakova and Myung Soo Kim. "Using exosomes, naturally-equipped nanocarriers, for drug delivery." Journal of Controlled Release 219 (2015), pp. 396-405. (Year: 2015).*

Koki Kamiya and Shoji Takeuchi. "Giant liposome formation toward the synthesis of well-defined artificial cells." Journal of Materials Chemistry B, vol. 5, 2017, pp. 5911-5923. (Year: 2017).*

Yingjie Zhai, Guangxi Zhai. "Advances in lipid-based colloid systems as drug carrier for topic delivery." Journal of Controlled Release, vol. 193, 2014, pp. 90-99. (Year: 2014).*

Kei Funakoshi, Hiroaki Suzuki, and Shoji Takeuchi. "Formation of Giant Lipid Vesiclelike Compartments from a Planar Lipid Membrane by a Pulsed Jet Flow." Journal of the American Chemical Society Communications, vol. 129, 2007, pp. 12608-12609 and S1-S5. (Year: 2007).*

Sato, Yuko T. et al. "Engineering hybrid exosomes by membrane fusion with liposomes" Scientific Reports, vol. 6, No. 1, Feb. 25, 2016 (11 pages).

Extended European Search Report issued in corresponding EP Application No. 18838832.6 dated Mar. 26, 2021 (8 pages).

Herdewijn, Piet et al., "Hexopyranosyl-Like Oligonucleotides", Carbohydrate Modifications in Antisense Research, ACS Symposium Series, American Chemical Society, 1994, pp. 80-99 (20 pages).

Bolli, M. et al., "α-Bicyclo-DNA: Synthesis, Characterization, and Pairing Properties of α-DNA-Analogues with Restricted Conformational Flexibility in the Sugar-Phosphate Backbone", Carbohydrate Modifications in Antisense Research, ACS Symposium Series, American Chemical Society, 1994, pp. 100-117 (18 pages).

Akbarzadeh, Abolfazl et al., "Liposome: classification, preparation, and applications", Nanoscale Research Letters, Springer Open Journal, vol. 8, No. 102, 2013, pp. 1-9 (9 pages).

Boomer, Jeremy A. et al., "Cytoplasmic Delivery of Liposomal Contents Mediated by an Acid-Labile Cholesterol-Vinyl Ether-PEG Conjugate", Bioconjugate Chemistry, American Chemical Society, vol. 20, 2009, pp. 47-59 (13 pages).

Goh, Wei Jiang et al., "Bioinspired Cell-Derived Nanovesicles versus Exosomes as Drug Delivery Systems: a Cost-Effective Alternative", Scientific Reports, vol. 7, No. 14322, Oct. 2017, pp. 1-10 (10 pages).

Carrington, James C. and Victor Ambros, "Role of MicroRNAs in Plant and Animal Development", Science, American Association for the Advancement of Science, vol. 301, No. 5631, Jul. 2003, pp. 336-338 (4 pages).

Csiszár, Agnes et al., "Novel Fusogenic Liposomes for Fluorescent Cell Labeling and Membrane Modification", Bioconjugate Chemistry, American Chemical Society, vol. 21, No. 3, Feb. 2010, pp. 537-543 (7 pages).

Karanth, H. and R.S.R. Murthy, pH-Sensitive liposomes-principle and application in cancer therapy, Journal of Pharmacy and Pharmacology, 2007, pp. 469-483 (16 pages).

Kooijmans, Sander AA et al., "Exosome mimetics: a novel class of drug delivery systems", International Journal of Nanomedicine, Dove Medical Press Ltd., vol. 7, Mar. 2012, pp. 1525-1541 (17 pages).

Morcos, Paul A., "Achieving targeted and quantifiable alteration of mRNA splicing with Morpholino oligos", Biochemical and Biophysical Research Communications, ScienceDirect, Elsevier Inc., vol. 358, May 2007, pp. 521-527 (7 pages).

Marcus-Sekura, Carol J., "Techniques for Using Antisense Oligodeoxyribonucleotides to Study Gene Expression", Analytical Biochemistry, vol. 172, 1988, pp. 289-295 (7 pages).

Kunisawa, Jun et al., "Pharmacotherapy by intracellular delivery of drugs using fusogenic liposomes: application to vaccine development", Advanced Drug Delivery Reviews, Elsevier Science B.V., vol. 52, 2001, pp. 177-186 (10 pages).

Langer, Robert, "New Methods of Drug Delivery", Science, American Association for the Advancement of Science, vol. 249, No. 4976, Sep. 1990, pp. 1527-1533 (8 pages).

Nakanishi, Mahito et al., "Gene delivery systems using the Sendai virus", Molecular Membrane Biology, Taylor & Francis, vol. 16, No. 1, 1999, pp. 123-127 (6 pages).

Shim, Min Suk and Young Jik Kwon, "Efficient and targeted delivery of siRNA in vivo", The FEBS Journal, The Authors Journal compilation, vol. 277, 2010, pp. 4814-4827 (14 pages).

Tan, Songwei et al., "Cell or Cell Membrane-Based Drug Delivery Systems", Theranostics, Ivyspring International Publisher, vol. 5, Issue 8, Apr. 2015, pp. 863-881 (19 pages).

Xu, Peipei et al., "Recent advancements in erythrocytes, platelets, and albumin as delivery systems", OncoTargets and Therapy, Dover Press Ltd., vol. 9, May 2016, pp. 2873-2884 (13 pages).

Pérez-Herrero, Edgar and Alberto Fernandez-Medarde, "Advanced targeted therapies in cancer: Drug nanocarriers, the future of chemotherapy", European Journal of Pharmaceutics and Biopharmaceutics, ScienceDirect, Elsevier B.V., vol. 93, Mar. 2015, pp. 52-79 (28 pages).

Li, Jian et al., "In vitro controlled release of cisplatin from gold-carbon nanobottles via cleavable linkages", International Journal of Nanomedicine, Dove Press Ltd., vol. 10, Dec. 2015, pp. 7425-7441 (17 pages).

Sercombe, Lisa et al., "Advances and Challenges of Liposome Assisted Drug Delivery", Frontiers in Pharmacology, vol. 6, Article 286, Dec. 2015, pp. 1-13 (13 pages).

(56) References Cited

OTHER PUBLICATIONS

Khodabandehloo, Hadi et al., "Nanocarriers Usage for Drug Delivery in Cancer Therapy", Iranian Journal of Cancer Prevention, Apr. 2016, pp. 1-7 (7 pages).

Zhu, Yuanyuan and Lianming Liao, "Applications of Nanoparticles for Anticancer Drug Delivery: A Review", Journal of Nanoscience and Nanotechnology, American Scientific Publishers, vol. 15, 2015, pp. 4753-4773 (21 pages).

Zhao, Ming et al., "Use of liposomal doxorubicin for adjuvant chemotherapy of breast cancer in clinical practice", Journal of Zhejiang University—Science B (Biomedicine & Biotechnology), Zhejiang University and Springer-Verlag Berlin Heidelberg, vol. 18, No. 1, 2017, pp. 15-26 (12 pages).

Kim, Kenneth H. et al., "Phase 1b safety study of farletuzumab, carboplatin and pegylated liposomal doxorubicin in patients with platinum-sensitive epithelial ovarian cancer", Gynecologic Oncology, ScienceDirect, Elsevier Inc., vol. 140, 2016, pp. 210-214 (5 pages).

Lomakin, Yakov et al., "Administration of Myelin Basic Protein Peptides Encapsulated in Mannosylated Liposomes Normalizes Level of Serum TNF-α and IL-2 and Chemoattractants CCL2 and CCL4 in Multiple Sclerosis Patients", Mediators of Inflammation, Hindawi Publishing Corporation, No. 2847232, Apr. 2016, pp. 699-706 (8 pages).

Molefi, Mooketsi et al., "Ambition-cm: intermittent high dose AmBisome on a high dose fluconazole backbone for cryptococcal meningitis induction therapy in sub-Saharan Africa: study protocol for a randomized controlled trial", Trials, BioMed Central, vol. 16, No. 276, 2015, pp. 1-11 (11 pages).

Suk, Jung Soo et al., "PEGylation as a strategy for improving nanoparticle-based drug and gene delivery", Advanced Drug Delivery Reviews, ScienceDirect, Elsevier B.V., vol. 99, 2016, pp. 28-51 (24 pages).

Estanqueiro, Marilene et al., "Nanotechnological carriers for cancer chemotherapy: The state of the art", Colloids and Surfaces B: Biointerfaces, ScienceDirect, Elsevier B.V., vol. 126, Jan. 2015, pp. 631-648 (18 pages).

Wong, Andrew D. et al., "Quantitative Analysis of the Enhanced Permeation and Retention (EPR) Effect", PLoS One, May 2015, pp. 1-13 (13 pages).

Vader, Pieter et al., "Extracellular vesicles for drug delivery", Advanced Drug Delivery Reviews, ScienceDirect, Elsevier B.V., vol. 106, Feb. 2016, pp. 148-156 (9 pages).

Su, Yixue et al., "Design Strategies and Applications of Circulating Cell-Mediated Drug Delivery Systems", ACS Biomaterials Science & Engineering, American Chemical Society, vol. 1, Mar. 2015, pp. 201-217 (17 pages).

Jang, Su Chul et al., "Bioinspired Exosome-Mimetic Nanovesicles for Targeted Delivery of Chemotherapeutics to Malignant Tumors", ACSNano, American Chemical Society, vol. 7, No. 9, Aug. 2013, pp. 7698-7710 (13 pages).

Berikkhanova, Kulzhan et al., "Red blood cell ghosts as promising drug carriers to target wound infections", Medical Engineering and Physics, ScienceDirect, Elsevier Ltd., vol. 38, 2016, pp. 877-884 (8 pages).

Goh, Wei Jiang et al., "Doxorubicin-loaded cell-derived nanovesicles: an alternative targeted approach for anti-tumor therapy", International Journal of Nanomedicine, Dove Press, vol. 12, Apr. 2017, pp. 2759-2767 (9 pages).

Sun, Yanan et al., "Advances of blood cell-based drug delivery systems", European Journal of Pharmaceutical Sciences, ScienceDirect, Elsevier B.V., vol. 96, 2017, pp. 115-128 (14 pages).

Szebeni, Janos et al., "Activation of complement by therapeutic liposomes and other lipid excipient-based therapeutic products: Prediction and prevention", Advanced Drug Delivery Reviews, ScienceDirect, Elsevier B.V., vol. 63, Jul. 2011, pp. 1020-1030 (11 pages).

Fang, Jun et al., "The EPR effect: Unique features of tumor blood vessels for drug delivery, factors involved, and limitations and augmentation of the effect", Advanced Drug Delivery Reviews, ScienceDirect, Elsevier B.V., vol. 63, 2011, pp. 136-151 (16 pages).

Bourgeaux, Vanessa et al., "Drug-loaded erythrocytes: on the road toward marketing approval", Drug Design, Development and Therapy, Dove Press, vol. 10, Feb. 2016, pp. 665-676 (12 pages).

Krishnamurthy, S. et al., "Monocyte cell membrane-derived nanoghosts for targeted cancer therapy", Nanoscale, Royal Society of Chemistry, vol. 8, Mar. 2016, pp. 6981-6985 (5 pages).

Nicolosi, Daria et al., "Encapsulation in fusogenic liposomes broadens the spectrum of action of vancomycin against Gram-negative bacteria", International Journal of Antimicrobial Agents, ScienceDirect, Elsevier B.V. and the International Society of Chemotherapy, vol. 35, 2010, pp. 553-558 (6 pages).

Kube, Sarah et al., "Fusogenic Liposomes as Nanocarriers for the Delivery of Intracellular Proteins", Langmuir, American Chemical Society, vol. 33, Jan. 2017, pp. 1051-1059 (9 pages).

Machluf, Marcelle, "Nano-Ghosts: Opening New Frontiers in Universal Targeted Drug and Gene Delivery", The Lab for Cancer Drug Delivery & Cell Based Technologies, Technion Israel Institute of Technology, Access Date: Jan. 21, 2021, URL: <http://drugcelltherapy.net.technion.ac.il/files/2013/03/One-pager-5.7.16.pdf> (1 page).

Ray, Amita, "The Significant Difference Between Micelles and Lipsomes", Buzzle, Access Date: Jun. 9, 2017, URL: <https://buzzle.com/articles/difference-between-micelles-and-liposomes.html> (3 pages).

Pignatello, Rosario et al, "Fusogenic liposomes as new carriers to enlarge the spectrum of action of antibiotic drugs against Gram-negative bacteria", Science against microbial pathogens: communicating current research and technological advances, Formatex, 2011, pp. 52-60 (9 pages).

Fang R.H. et al., "Lipid-insertion enables targeting functionalization of erythrocyte membrane-cloaked nanoparticles", Nanoscale, Jul. 19, 2013, vol. 5, pp. 8884-8888 (13 pages).

Meyer R.A. et al., "Biomimetic anisotropic polymeric particles with natually derived cell membranes for enhanced drug delivery", Tissue Engineering Part A, Dec. 1, 2016, vol. 22, No. S1 (156 pages).

Pitchaimani A. et al., "Membrane Fusion-Mediated Gold Nanoplating of Red Blood Cell: A Bioengineered CT-Contrast Agent", ACS Biomaterials Science and Engineering, pp. 36-41 (6 pages), Jan. 26, 2018.

Dehaini D. et al., "Erythrocyte-Platelet Hybrid Membrane Coating for Enhanced Nanoparticle functionalization". Adv Mater, Feb. 15, 2017, vol. 29, No. 16 (18 pages).

Seema R. et al., "Liposomes: Preparations and Applications", Int J Drug Dev & Res, Oct.-Dec. 2012, vol. 4, No. 4, pp. 108-115 (8 pages).

Goh W.J. et al., "nCVTs: a hybrid smart tumour targeting platform", Mar. 13, 2018, vol. 10, No. 15, pp. 6812-6819 (8 pages).

Pitchaimani A. et al., "Natural killer cell membrane infused biomimetic liposomes for targeted tumor therapy", Biomaterials, Jan. 16, 2018, vol. 160, pp. 124-137 (14 pages).

International Search Report issued in corresponding International Application No. PCT/SG2018/050376 dated Oct. 19, 2018 (4 pages).

Written Opinion issued in corresponding International Application No. PCT/SG2018/050376 dated Oct. 19, 2018 (10 pages).

Weintraub, Harold M. "Antisense RNA and DNA" Scientific American , Jan. 1990, vol. 262, No. 1, pp. 40-47 (9 pages).

Aryal, Santosh et al. "Paramagnetic Gd3+ labeled red blood cells for magnetic resonance angiography" Biomaterials vol. 98, Aug. 2016, pp. 163-170 (8 pages).

Andersson, Jakob et al. "Tethered Membrane Architectures-Design and Applications" Frontiers in Materials, Sep. 2018, vol. 5, Article 55 (11 pages).

Chakrabarti, Kristi R. et al. "Lipid tethering of breast tumor cells enables real-time imaging of free-floating cell dynamics and drug response" Oncotarget, vol. 7, No. 9 pp. 10489-10497 (12 pages), published Feb. 8, 2016.

B. Xiang et al. "Preparation of Drug Liposomes by Thin-Film Hydration and Homogenization" In: Lu, WL., Qi, XR. (eds) Liposome-Based Drug Delivery Systems. Biomaterial Engineering. Springer, Berlin, Heidelberg; Dec. 4, 2017; https://doi.org/10.1007/978-3-662-49231-4_2-1 (11 pages).

(56) References Cited

OTHER PUBLICATIONS

M. Badran; "Formulation and In Vitro evaluation of Flufenamic Acid Loaded Deformable Liposomes for Improved Skin Delivery"; Digest Journal of Nanomaterials and Biostructures, vol. 9, No. 1, pp. 83-91; Jan.-Mar. 2014 (9 pages).

M. Chen et al.; "Skin penetration and deposition of carboxyfluorescein and temoporfin from different lipid vesicular systems: In vitro study with finite and infinite dosage application"; International Journal of Pharmaceutics, vol. 408, Issues 1-2, pp. 223-234; Apr. 2011 (12 pages).

M. Chiba et al.; "Quantitative Analysis of the Lamellarity of Giant Liposomes Prepared by the Inverted Emulsion Method"; Biophysical Journal, vol. 107, pp. 346-354; Jul. 2014 (9 pages).

D. Lombardo et al.; "Methods of Liposomes Preparation: Formation and Control Factors of Versatile Nanocarriers for Biomedical and Nanomedicine Application"; Pharmaceutics, vol. 14, No. 543; Feb. 2022 (49 pages).

B. Mui et al.; "Extrusion Technique to Generate Liposomes of Defined Size"; Methods in Enzymology, vol. 367, pp. 3-14; 2003 (12 pages).

D. C. A. Putri et al.; "Optimization Of Mixing Temperature And Sonication Duration In Liposome Preparation"; Jurnal Farmasi Sains Dan Komunitas, vol. 14, No. 2, pp. 79-85; Nov. 2017 (7 pages).

\* cited by examiner

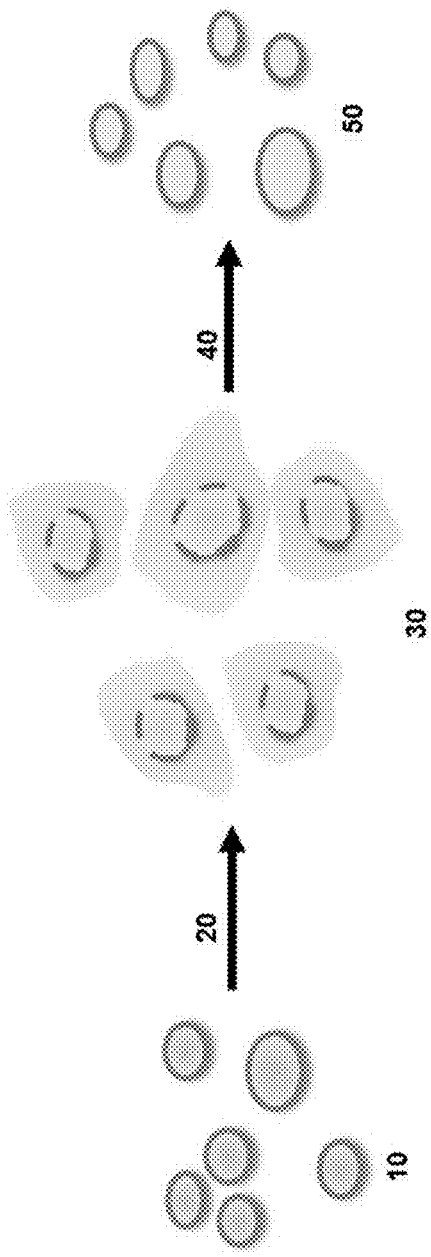
FIGURE 1A
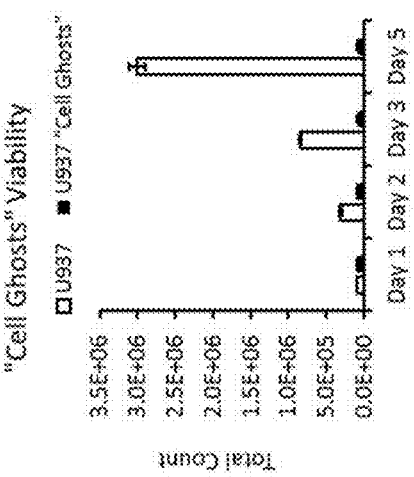
FIGURE 1E
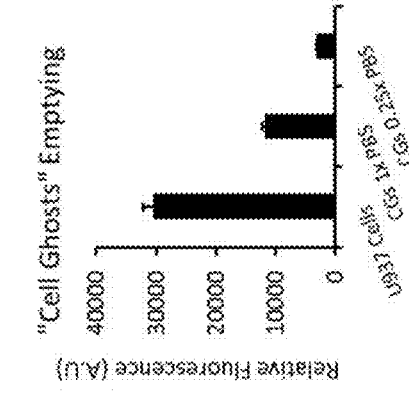
FIGURE 1D
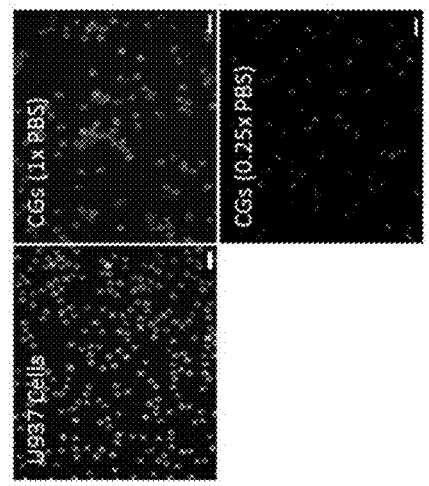
FIGURE 1C
FIGURE 1B

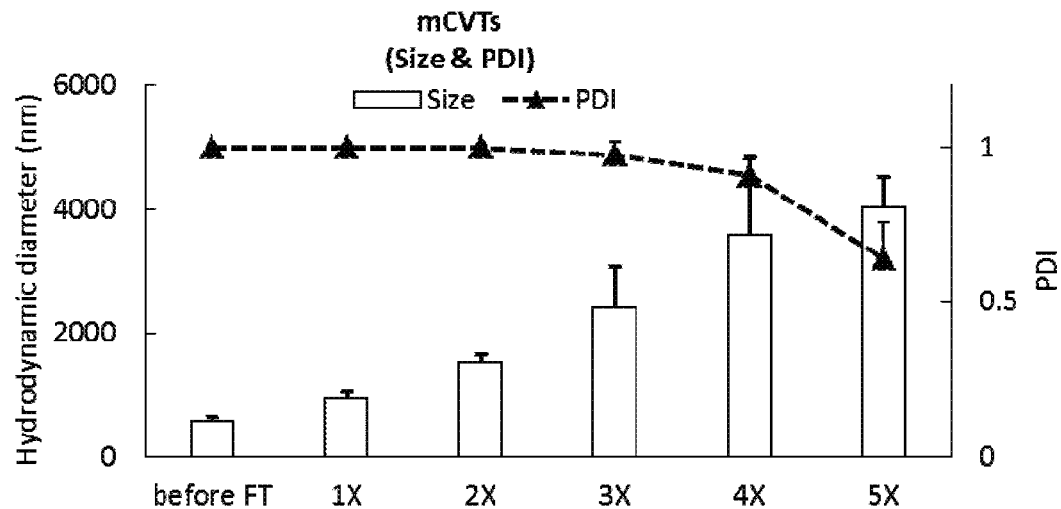
FIGURE 2
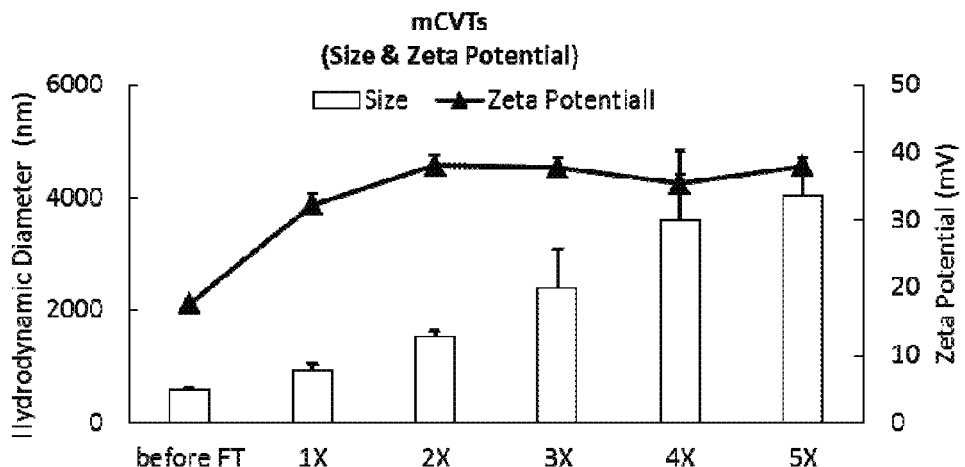
FIGURE 3A
FIGURE 3B

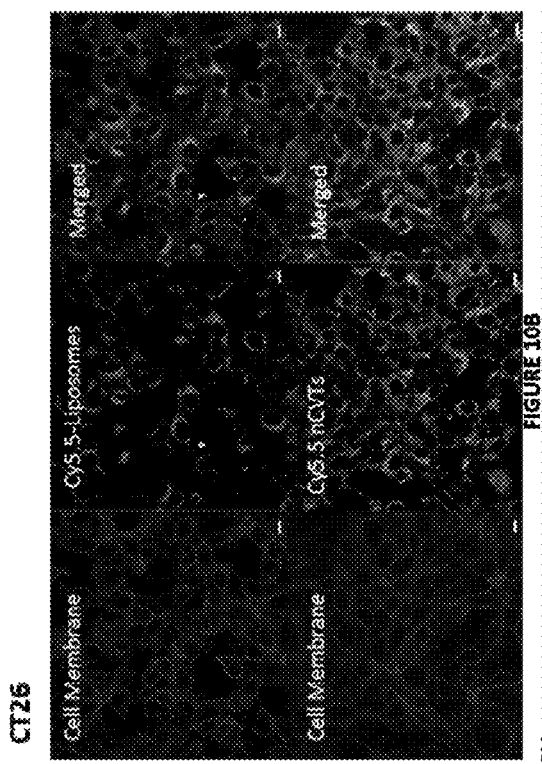
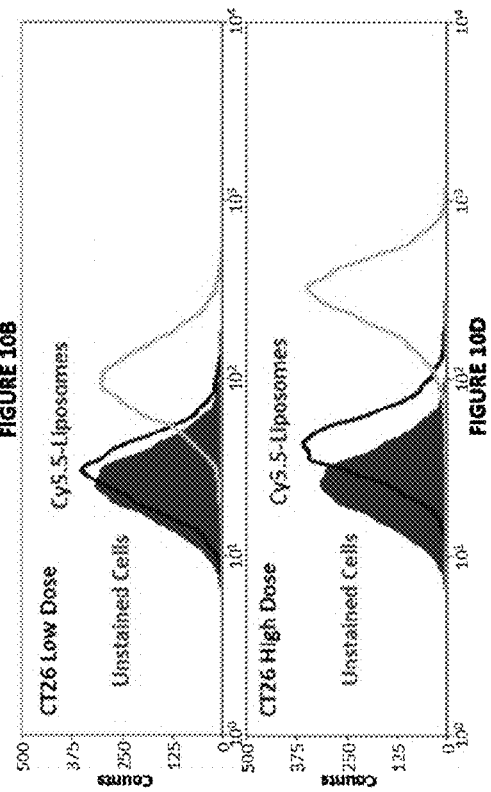
FIGURE 10A
FIGURE 10B
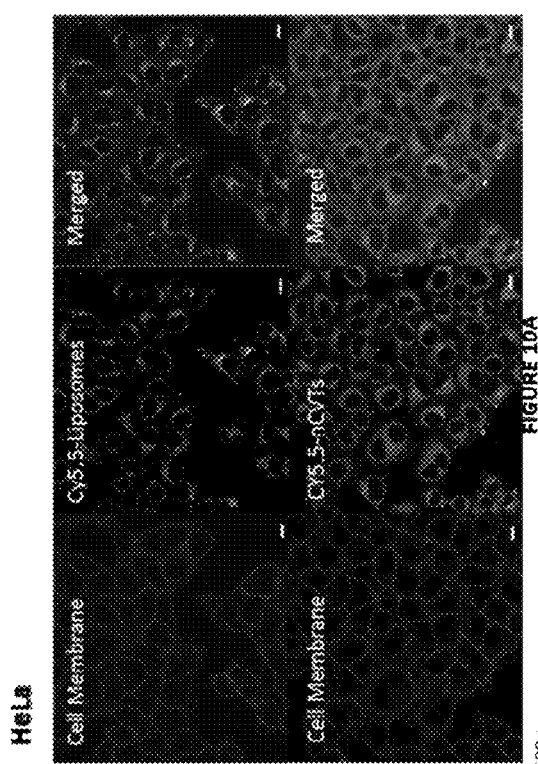
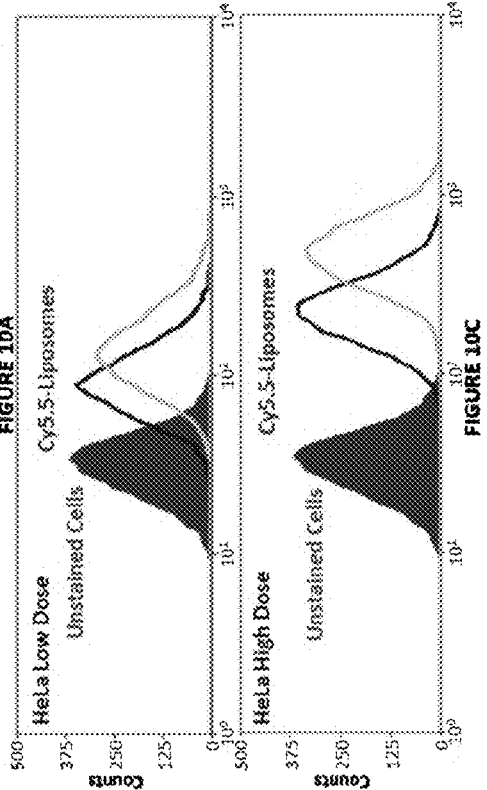
FIGURE 10C
FIGURE 10D

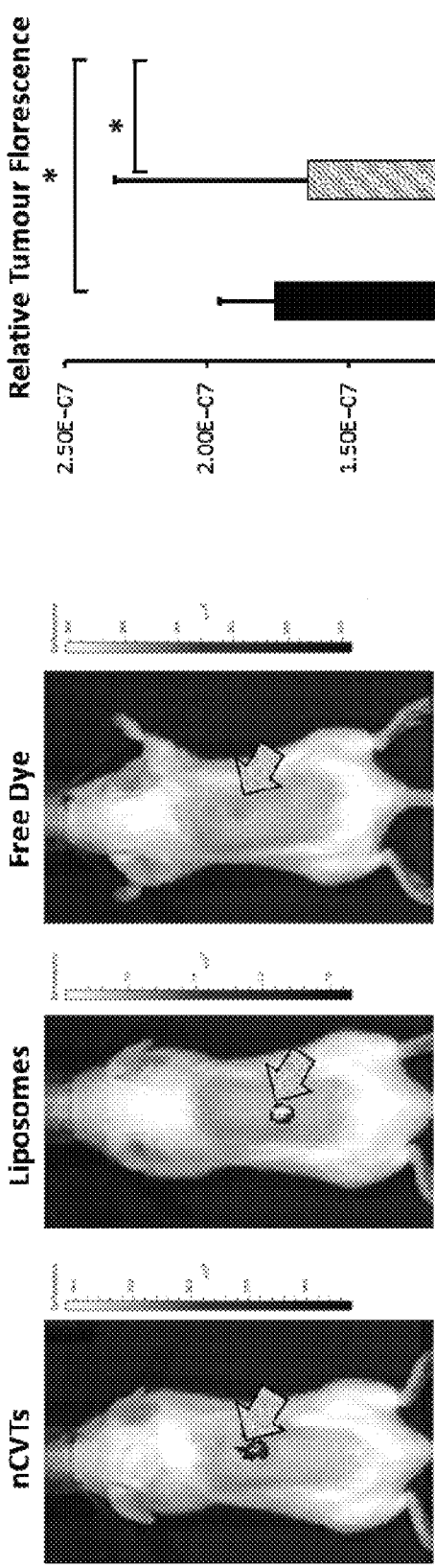
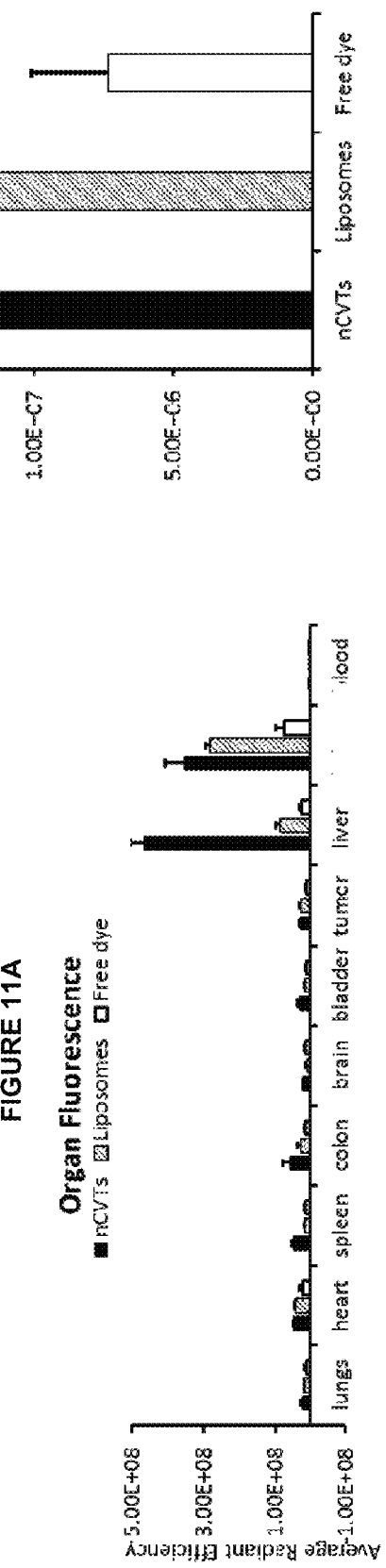
FIGURE 11A
FIGURE 11B
FIGURE 11C

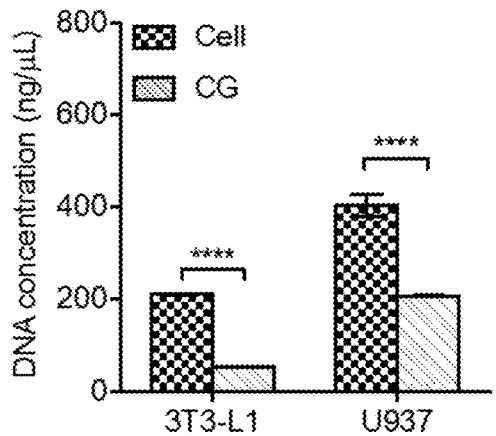
FIGURE 13C
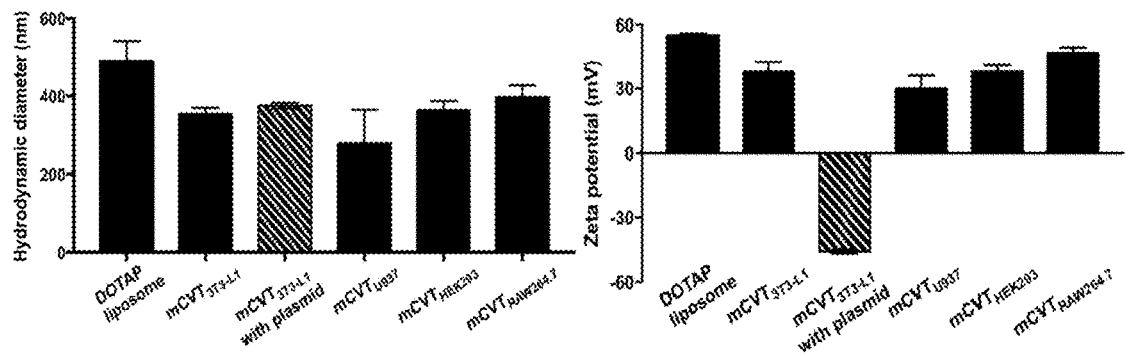
FIGURE 14A
FIGURE 14B
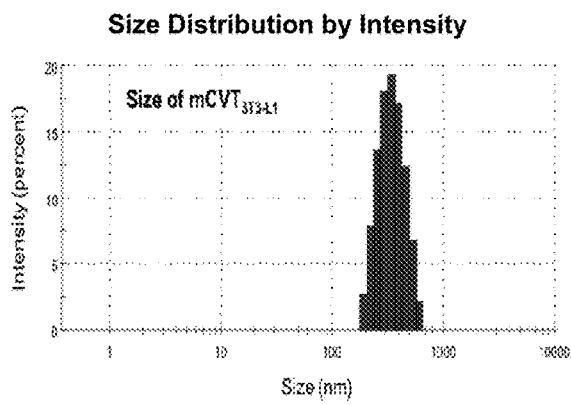
FIGURE 14C
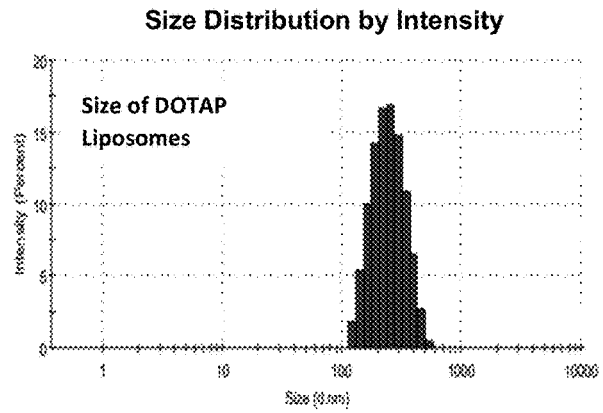
FIGURE 14D FIGURE 15A
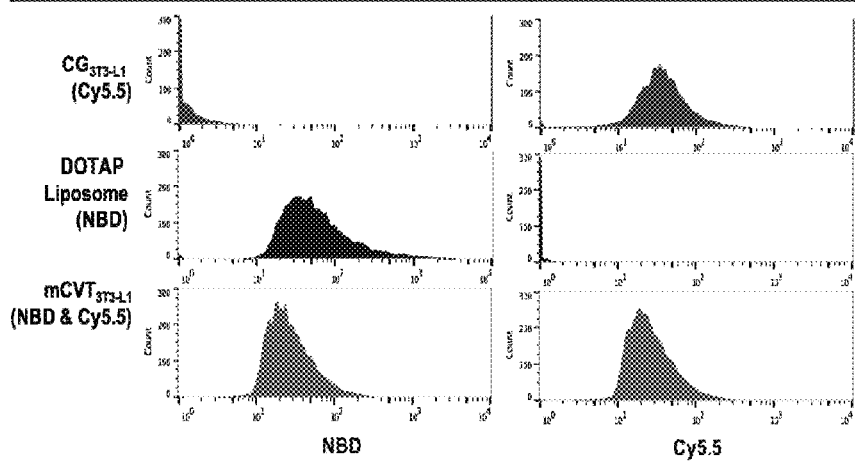
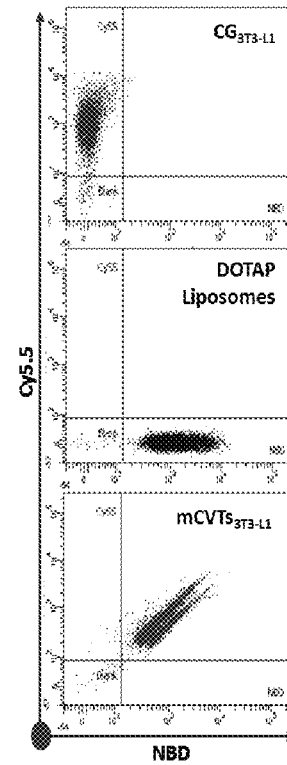
FIGURE 15B  FIGURE 15C
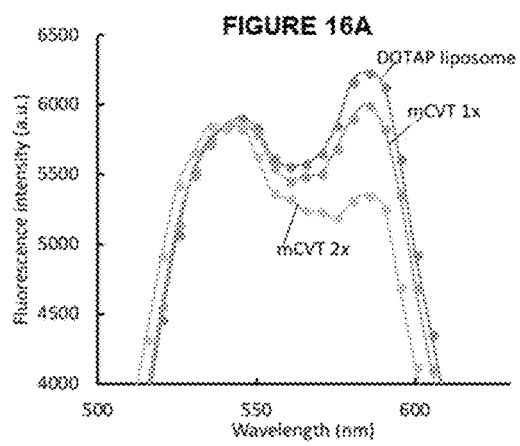
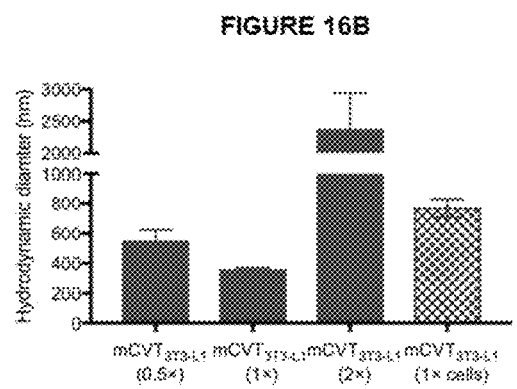
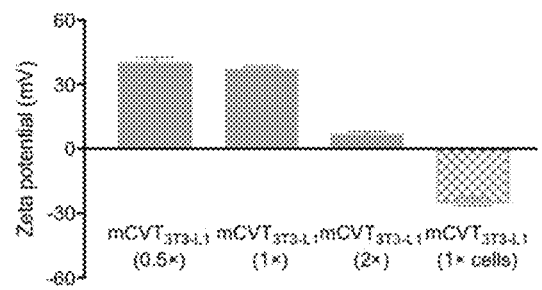
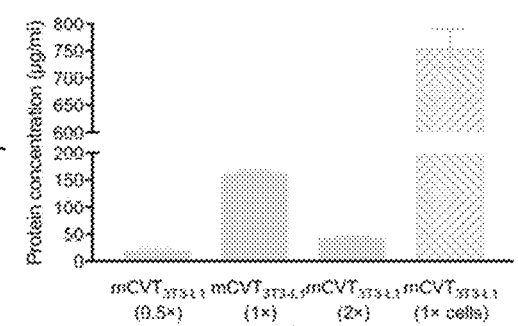

BIOMOLECULAR COMPOSITES COMPRISING MODIFIED CELL GHOSTS

FIELD OF INVENTION

The present invention is concerned with biomolecular composites suitable for the delivery of exogenous materials to cells. More particularly, the present invention provides modified cell ghosts which can deliver a cargo to a target cell or tissue.

BACKGROUND

The listing or discussion of an apparently prior-published document in this specification should not necessarily be taken as an acknowledgement that the document is part of the state of the art or is common general knowledge.

A major challenge in the delivery of exogenous materials to cells, for example, delivery of therapeutics, lies in the uptake of the therapeutic by the target cells. Liposome formulations have been tested in the hope of reducing toxicity and increasing cellular uptake at the target site, but the results have not been satisfactory due to their colloidal and biological instability. The preparation and loading of liposomes has been described (for example, Kooijmans, et al 2012, Xu et al, 2016).

However, a major drawback of liposomal systems is the relatively low cellular uptake of the nanoparticles by the target cells. Other drug delivery systems that have been studied (e.g. by Tan et al, 2015) include cell membrane-derived vesicles, membrane vesicles such as microvesicles and exosomes, and nanovesicles.

A major challenge in current transfection techniques is the transfection into Hard-To-Transfect (HTT) cells. Current non-viral methods such as electroporation or chemical transfection by cationic chemicals face issues of either low transfection rates or high cell toxicity. Viral transfection methods raise safety concerns when translated to clinical practice and require additional safety protocols and training prior to use.

Thus, there is a need to develop better vehicles for the delivery of exogenous materials to cells such as in drug delivery and cell transfection.

SUMMARY OF INVENTION

In a first aspect the present invention provides a biomolecular composite comprising a cell ghost which has been emptied of all or substantially all of the cytosolic contents of the cell including the nucleus and nuclear contents, wherein said composite has a hydrodynamic diameter of less than about 6 μm.

In a preferred embodiment the present invention provides a biomolecular composite, wherein said ghost cell comprises endogenous ligands suitable for targeting the composite to a desired cell or tissue.

In another preferred embodiment the present invention provides a biomolecular composite according to any aspect of the invention further comprising lipids incorporated into said composite by fusion of a cell ghost with lipids and/or a vesicular structure.

In another preferred embodiment the present invention provides a biomolecular composite according to any aspect of the invention, wherein the said lipids and/or vesicular structure comprise at least one fusogenic lipid and/or at least one fusogenic peptide such as Sendai virus fusion protein.

In another preferred embodiment the present invention provides a biomolecular composite according to any aspect of the invention further comprising a cargo molecule.

Preferably the cargo molecule is an imaging agent, a therapeutic agent or a combination thereof.

In a second aspect the present invention provides a pharmaceutical composition comprising a biomolecular composite and a pharmaceutically acceptable carrier, wherein said cargo molecule is a therapeutic agent.

In a third aspect the present invention provides a kit comprising (A) (i) a biomolecular composite comprising a cargo molecule, wherein said cargo molecule is a therapeutic agent or a pharmaceutical composition and (ii) instructions for use; or (B) (i) a biomolecular composite and (ii) a cargo molecule and (iii) instructions for use; or (C) (i) a cell ghost (ii) lipids and/or a vesicular structure or components thereof (iii) a cargo molecule and (iv) instructions for use.

In an fourth aspect the present invention provides a method for the treatment of a disease or condition in a patient in need of such treatment comprising administering to the patient an effective amount of a biomolecular composite comprising a cargo molecule, wherein said cargo molecule is a therapeutic agent for the treatment of said disease or condition.

In a fifth aspect the present invention provides a biomolecular composite according to any aspect of the invention, for use in therapy.

In a sixth aspect the present invention provides the use of a biomolecular composite according to any aspect of the invention in the manufacture of a medicament for use in therapy.

In a seventh aspect the present invention provides a method for the diagnosis of a disease in a subject comprising administering to the subject a biomolecular composite comprising a cargo molecule, wherein said cargo molecule is an imaging agent. Preferably the biomolecular composite further comprising lipids incorporated into said composite by fusion of a cell ghost with lipids and/or a vesicular structure.

In an eighth aspect the present invention provides a method of introducing exogenous material to an isolated cell comprising contacting the isolated cell with a biomolecular composite comprising a cargo molecule according to any aspect of the invention.

In a ninth aspect the present invention provides a method of manufacturing a biomolecular composite comprising the steps of:

(a) providing at least one cell;

(b) removing all or substantially all of the cytosolic contents of the cell including the nucleus and nuclear contents by exposing the cell to an osmotically active solution that is hypotonic to the cell;

(c) re-sealing the cell in isotonic solution to form a cell ghost;

(d) forming the biomolecular composite by shearing said cell ghost, extruding the cell ghost, or by freeze thawing and sonicating the cell ghost, under conditions that effect a size reduction to a hydrodynamic diameter of less than 6 μm, preferably in a range from about 5 μm to about 50 nm.

In a tenth aspect the present invention provides a method of manufacturing a biomolecular composite according to the ninth aspect, wherein the biomolecular composite further comprises additional exogenous lipids incorporated into said composite, said method comprising the steps of:

(a) providing at least one cell ghost from step (c) of the ninth aspect;
(b) contacting the at least one cell ghost with lipids and/or a vesicular structure; and
(c) fusing the lipids and/or vesicular structure with the cell ghost by shearing, extrusion, or by freeze thawing and sonicating the cell ghost, lipids and/or vesicular structure together under conditions that effect a size reduction to a hydrodynamic diameter of less than 6 µm, preferably in a range from about 5 µm to about 50 nm.

In an eleventh aspect the present invention provides a method of producing cell ghosts from viable cells comprising a cell membrane, cytosol and nucleus, comprising the steps of:
(a) providing a suspension of viable cells in an osmotically active solution that is hypotonic to the cell;
(b) gently agitating the hypotonic cell suspension for a period of time so that osmotic pressure renders the membrane permeable and contents of the cytosol and nucleus leak from the viable cells, thereby creating at least partially depleted cells;
(c) separating cellular debris including contents of the cytosol and nucleus from the at least partially depleted cells;
(d) repeating (b) and (c) if necessary until the at least partially depleted cells are depleted of contents of the cytosol and nucleus;
(e) suspending the depleted cells in an isotonic medium for a period of time to allow resealing of the cell membrane to produce cell ghosts;
(f) isolating the cell ghosts.

Biomolecular composites that are of micro dimensions are herein termed micro cell vesicle technology (mCVTs) and biomolecular composites that are of nano dimensions are herein termed nano cell vesicle technology (nCVTs). Typically mCVTs have a diameter of more than 300 nm, usually in the range of 300 nm to 5 µm, more often 300 to 800 nm. Typically, nCVTs have a diameter of less than 300 nm, usually in the range of 50 to 250 nm, more often 100 to 200 nm. Biomolecular composites derived from micelles have a diameter of less than 50 nm. The term "CVTs" is used herein to describe biomolecular composites in accordance with the present invention without necessarily inferring a limitation on the particle size. Only where the term "CVTs" is used in a context which requires that the CVTs be micro or nano scale should such a limitation as to size be inferred.

BRIEF DESCRIPTION OF THE DRAWINGS

In order that the disclosure may be readily understood and put into practical effect, reference will now be made to embodiments as illustrated with reference to the accompanying figures. The figures together with the description serve to further illustrate the embodiments of the invention and explain various principles and advantages.

FIG. 1 shows (A) A cell ghost production method for U937 monocytes. (B) Fluorescence microscopy images of U937 cells, U937 cells incubated in 1×PBS 0.06% sucrose and U937 cells incubated in 0.25×PBS 0.06% sucrose. Scale bars indicate 100 µm. All samples started with $1\times10^6$ cells and were stained with CellTracker™ Green CMFDA to track the emptying progress. (C) Quantification of the relative fluorescence of CellTracker™ Green CMFDA to demonstrate the emptying of cell contents in the cell ghost protocol. (D) Light microscopy images of U937 cell ghosts before and after staining with trypan blue stain. Trypan blue is actively removed by live cells whereas non-viable cells do not exhibit this property. Scale bars indicate 100 µm. (E) Cell viability tests of U937 cells and cell ghosts, done with a total count over 5 days.

FIG. 2 shows the percentage yield and nuclei removal of Cell Ghosts produced from various cell lines using different PBS concentrations.

FIG. 3 shows the physical characterization of mCVTs prepared from 5 freeze thaw cycles. As a result of fusion between the DOTAP film and cell ghosts, mCVTs become progressively larger with each freeze thaw cycle.

FIG. 9 shows preliminary transfection results of mCVTs in comparison with an industry reagent, Lipofectamine® 3000 (LF3000). Transfection was carried out by adding 5 µg of plasmid encoding for Green Fluorescent Protein (GFP) to mCVTs and LF3000. The mixture was allowed to stand for 10 minutes before addition to 3T3-L1 cells, a Hard-To-Transfect cell, for 48 hours transfection. Bright field and Hoechst 33342, which stains live cells, images showed considerably higher live and healthy cells for mCVTs compared to LF3000. The degree of transfection (GFP) appears to be similar.

FIG. 10 shows (A-B) Cellular uptake of Cy5.5 labelled nCVTs by HeLa and CT26 cells after incubation for 2 hours, at low and high doses. Both liposomal and nCVTs were normalized to the lowest common Cy5.5 fluorescence intensity. This constitutes a low dose. A concentration of 5× the lowest common normalized Cy5.5 fluorescence intensity constitutes a high dose. Cell membranes were stained by CellMask Orange to show cellular uptake. For comparison, nCVTs without cell ghosts were prepared, (labelled Cy5.5-Liposomes) and tested on HeLa and CT26 cells. Scale bars indicates 10 µm. (C-D) FACS quantitative uptake at 2 hours of Cy5.5 labelled nCVTs and Liposomes by HeLa and CT26 cells. Samples were normalized to the same relative fluorescence intensity before use. Two sample concentrations, low dose corresponding to 1× normalized fluorescence and high dose corresponding to 5× fluorescence intensities, were prepared.

FIG. 11 shows (A) Representative IVIS fluorescence of tumours on whole mice. Tumours are indicated by arrows. Radiant efficiency is [(p/sec/cm$^2$/sr)/($\mu$W/cm$^2$)]. Color scale for the image with nCVTs ranges from 3.32e7 (min) to 3.82e7. Color scale for the image with liposomes ranges from 6.94e7 (min) to 7.79e7. Color scale for the image with free dye ranges from 2.58e7 (min) to 2.68e7. (B) Relative fluorescence intensities of excised organs quantified by IVIS. (C) Relative fluorescence intensity of excised tumours. * indicates P<0.05.

FIG. 14 shows (A) Size of different mCVTs and mCVT$_{3T3-L1}$ with plasmid compared to DOTAP liposome. The size of all mCVTs are smaller than 500 nm. (B) Zeta potential of different mCVTs and mCVT$_{3T3-L1}$ with plasmid compared to DOTAP liposome. The zeta potential of all mCVTs are above +30 mV, except for mCVT$_{3T3-L1}$ with plasmid DNA, showing negative zeta potential due to the interaction with plasmid DNA. (C) Z-average size distribution of mCVT$_{3T3-L1}$ size by intensity. (D). Z-average size distribution of DOTAP liposomes by intensity. Triplicates were performed for all experiments.

FIG. 15 shows (A) Postulated experimental results should fusion occur. Both in CG$_{3T3-L1}$ and DOTAP liposome samples should show only the presence of a single fluorophore, whereas the mCVTs should show the presence of 2 fluorophores (both NBD and Cy5.5). (B) Flow cytometry of samples using single colour channel. (C) Flow cytometry results of samples using dual colour channels.

FIG. 16 shows (A) Fluorescence spectra of DOTAP liposomes, mCVTs with 1× standard batch of CGs (mCVTs 1×) and mCVTs with 2× standard batch of CGs (mCVTs 2×). The depression of the fluorescence of the second peak indicated that the two fluorophores (rhodamine & NBD) were pushed apart by CGs membrane components, suggesting fusion. (B) Size of mCVT$_{3T3-L1}$ (0.5×), mCVT$_{3T3-L1}$ (1×), mCVT$_{3T3-L1}$ (2×) & mCVT$_{3T3-L1}$ (1× cells), varying the amount of CGs used with a standard amount (1×) set at 1×10$^7$ CGs. (C) Zeta potential of mCVT$_{3T3-L1}$ (0.5×) mCVT$_{3T3-L1}$ (1×), mCVT$_{3T3-L1}$ (2×) and mCVT$_{3T3-L1}$ (1× cells). (D) Protein concentration of mCVT$_{3T3-L1}$ (0.5×) mCVT$_{3T3-L1}$ (1×), mCVT$_{3T3-L1}$ (2×) and mCVT$_{3T3-L1}$ (1× cells).

DETAILED DESCRIPTION OF THE INVENTION

Figure 4:
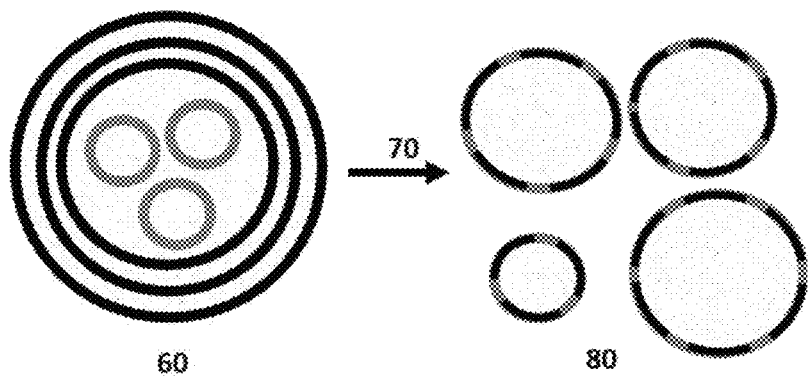
FIG. 4 is a schematic diagram of mCVT production. U937 cell ghosts were added to a thin film of 10 mg DOTAP, and sonicated for 60 minutes. The mixture is then put through 5 freeze thaw cycles to produce mCVTs.

The present invention provides a biomolecular composite which may be a ghost cell which has been emptied of all or substantially all of its cytosolic contents including the nucleus and nuclear contents, wherein said composite has a hydrodynamic diameter of less than about 6 $\mu$m, or said biomolecular composite may also comprise endogenous membrane material by said ghost cell being fused with exogenous amphipathic molecules such as lipids and/or a vesicular structure. The biomolecular composite may also comprise a cargo molecule.

A "cell ghost" as used herein is a cell which has been emptied of all or substantially all of the cytosolic contents of the cell including the nucleus and nuclear contents. Cell ghosts resemble the cell from which they are derived but are non-viable and have a much reduced cytoplasm. The cell membrane of a cell ghost includes lipids and proteins and generally retains the characteristics of the cell. For example, cell ghosts derived from monocyte cell lines retain the intrinsic targeting properties of monocytes towards inflammation sites.

In a preferred embodiment said biomolecular composite has a hydrodynamic diameter selected in the range from about 5 $\mu$m to about 50 nm. The desired size of the biomolecular composite can be obtained using methods such as shearing said cell ghost, extruding the cell ghost, or by freeze thawing and sonicating the cell ghost, preferably in the presence of exogenous amphipathic molecules under conditions that effect a size reduction to a desired hydrodynamic diameter.

In a preferred embodiment the cell ghosts are derived from cells selected from the group comprising monocytes, macrophages, T cells, B cells, Natural Killer cells, stem cells, red blood cells, adipose cells, foam cells and tumour cells.

In another preferred embodiment cell ghosts are derived from cell lines of human monocytes, human T cells, mouse colon carcinoma, human cervical cancer cells, human kidney epithelial cells, mouse preadipocytes and human mesenchymal stem cells.

In another preferred embodiment cell ghosts are derived from a cell line selected from the group comprising RAW264.7 (mouse macrophage), HaCaT (human keratinocyte), HDF (human dermal fibroblast) and, more particularly, U937 (human monocytes), Jurkat (human T cells), CT26 (mouse colon carcinoma), HeLa (human cervical cancer), HEK293 (human kidney epithelial), 3T3-L1 (mouse preadipocytes) and HMSC (human mesenchymal stem cells).

In another preferred embodiment cell ghosts are derived from cell lines of monocytes.

In another preferred embodiment cell ghosts are derived from cell lines of human monocytes.

In another preferred embodiment cell ghosts are derived from cell lines of U937 human monocytes.

The biomolecular composite preferably has targeting capacity due to selective inclusion of cell ghost derived from a cell with intrinsic targeting properties. In an embodiment a monocyte cell line is selected for cell ghost formation due to intrinsic targeting properties of monocytes towards inflammation sites.

A T cell line that has been activated towards a specific tumour phenotype could be selected for cell ghost formation due to intrinsic targeting properties of T cells towards the tumour expressing a specific phenotype. Alternatively a T cell line that has been activated towards a variety of tumour phenotypes is selected for cell ghost formation due to intrinsic targeting properties of T cells towards the tumour, as opposed to targeting a single target site.

Similarly, a T cell line that has been activated towards a specific phenotype expressed in cells infected by a virus is selected for cell ghost formation due to intrinsic targeting properties of T cells towards infected cells.

A cell line that is of transfection interest could be selected for cell ghost formation due to intrinsic self-targeting properties which facilitate transfection.

Tumour cells may be selected for cell ghost formation in order to express tumour ligands on the surface of CVTs. This may in turn by used in an ex vivo or in vivo settings to stimulate the activation and expansion of T cells in a form of immunotherapy.

In another preferred embodiment said ghost cell comprises ligands suitable for targeting the composite to a desired cell or tissue. Alternatively, ligands suitable for targeting the composite to a desired cell or tissue could be incorporated into a cell ghost by fusion with lipids and/or vesicular structures comprising the ligands.

As used herein the term "amphipathic molecules" refers to a molecule composed of a hydrophilic portion, generally referred to as a "hydrophilic head", and a hydrophobic portion generally referred to as a "hydrophobic tail". Such molecules can form vesicular structures in which the hydrophobic tails associate to create a hydrophobic core and the hydrophilic heads associate with an external, aqueous environment. One such structure is a liposome in which a phospholipid bilayer is oriented in a generally circular/spherical configuration such that the hydrophilic heads of one layer surround an aqueous core while the hydrophilic heads of the other layer interact with a bulk aqueous phase. Another such structure is a micelle in which a monolayer arranges itself with hydrophobic tails associated in a hydrophobic core and hydrophilic heads interacting with a bulk aqueous phase. Also included are lipids and surfactants.

In another preferred embodiment the vesicular structure comprises compounds selected from the group consisting of phospholipids, sphingolipids, ceramides and glycosphingolipids, and combinations thereof.

In another preferred embodiment the vesicular structure is a liposome.

In another preferred embodiment the liposome is a fusogenic liposome.

As used herein a "fusogenic liposome" is a liposome which shows an enhanced ability to interact with cell membranes and thereby to fuse with the membrane of a target cell, releasing the contents of the vesicle within the liposome directly into the cytoplasm of the target cell. Fusogenic liposomes can be produced by incorporating fusogenic lipids or fusogenic peptides in a liposome.

In another preferred embodiment the liposome comprises at least one fusogenic lipid.

As herein a "fusogenic lipid" is a lipid which enhances the ability of a liposome to interact with cell membranes and thereby to fuse with the membrane of a target cell when incorporated in a liposome. Fusogenic lipids are generally cationic lipids that make the vesicles more fluid when incorporated therein (Karanth et al, Boomer, et al, Csiszar et al) but other lipids may be fusogenic, for example, DOPE (1,2-dioleoyl-sn-glycero-3-phosphoethanolamine) facilitates mixing of lipids as a result of its conical shape.

In another preferred embodiment the fusogenic lipid is a cationic lipid.

In another preferred embodiment the fusogenic lipid is selected from the group consisting of 1,2-dioleoyl-3-trimethylammonium-propane (DOTAP), 1,2-dipalmitoyl-sn-glycero-3-phosphocholine (DPPC), L-α-phosphatidylcholine (HSPC), (N-(1-(2, 3-dioleoyloxy)propyl)-N,N,N-trimethylamine) (DOTMA) and (dimethyl-dioctadecyl-ammonium-bromide (DDAB), 1,2-dioleoyl-sn-glycero-3-phosphoethanolamine (DOPE), distearophosphoethanolamine polyethyleneglycol 2000 (DSPE-PEG2000), 1,2-distearoyl-sn-glycero-3-phosphoethanolamine-N-[amino(polyethylene glycol)-2000] (DSPE-PEG2000 Amine) and 1,2-distearoyl-sn-glycero-3-phosphoethanolamine-N-[biotinyl(polyethyleneglycol)-2000] (DSPE-PEG2000 Biotin), or combinations thereof.

In another preferred embodiment the liposome comprises 1,2-dipalmitoyl-sn-glycero-3-phosphocholine (DPPC).

In another preferred embodiment the liposome comprises 1,2-dioleoyl-3-trimethylammonium-propane (DOTAP).

In another preferred embodiment the liposome comprises 10 to 100% fusogenic lipid.

In an embodiment the hybrid molecule comprise 40 to 99% fusogenic lipid.

In another preferred embodiment the liposome comprises 60 to 95% fusogenic lipid.

In another preferred embodiment the liposome comprises a fusogenic peptide.

As herein a "fusogenic peptide" is a peptide which enhances the ability of a liposome to interact with cell membranes and thereby to fuse with the membrane of a target cell when incorporated in a liposome. By way of example, inactivated Sendai virus envelope components (Nakanishi et al, Kunisawa et al) as well as other fusogenic peptides can achieve this goal (Shim et al).

In another preferred embodiment the fusogenic peptide comprises inactivated Sendai virus envelope components.

In another preferred embodiment a fusogenic peptide is conjugated to a lipid. By way of example the fusogenic peptide may be conjugated to DSPE (1,2-distearoyl-sn-glycero-3-phosphoethanolamine) and co-formulated with cholesterol in a 95:5 molar ratio to form a liposome.

In another preferred embodiment the vesicular structure is a micelle.

The vesicular structure may further comprise compounds selected from the group consisting of saturated glycerides, steroids, synthetic phospholipids, triglycerides, waxes, terpenes, vitamins and combinations thereof. Optionally, the biomolecular composite further comprises modified lipids, wherein the modified lipids comprise biotin, avidin, streptavidin, azide groups, alkyne groups, polyethylene glycol chains, folate, or combinations thereof. By way of example, a lipid modified to include click chemistry components such as DSPE-PEG(2000)-DBCO (1,2-distearoyl-sn-glycero-3-phosphoethanolamine-N-[dibenzocyclooctyl(polyethylene glycol)-2000]) co-formulated with DPPC and cholesterol in a molar ratio of (0.15:1.85:1) can be used to form a liposome. A fusogenic peptide that has been modified by the addition of an azide group can be added using click chemistry. Optionally, the biomolecular composites further include labelled lipids, wherein the labelled lipids comprise a fluorescent label, a luminescent label, a bioluminescent label, a chemiluminescent label and a radioactive label, or combinations thereof.

A "label" or a "detectable moiety" as used herein is a composition detectable by spectroscopic, photochemical, biochemical, immunochemical, chemical, or other physical means. For example, useful labels include 32P, fluorescent dyes, electron-dense reagents, enzymes (e.g., as commonly used in an ELISA), biotin, digoxigenin, or haptens and proteins or other entities which can be made detectable.

In another preferred embodiment the liposome further comprises a steroid.

In another preferred embodiment the liposome further comprises cholesterol.

In another preferred embodiment the liposome comprises 1,2-dipalmitoyl-sn-glycero-3-phosphocholine (DPPC) and cholesterol.

In another preferred embodiment the liposome comprises 1,2-distearoyl-sn-glycero-3-phosphoethanolamine (DSPE) and cholesterol.

In another preferred embodiment the liposome has between a 0.01:99.9 molar ratio of steroid to lipid and a 20:80 molar ratio of steroid to lipid. Advantageously, the liposome has between a 1:99 molar ratio of steroid to lipid and a 10:90 molar ratio of steroid to lipid, typically 5:95 molar ratio of steroid to lipid.

In another preferred embodiment the biomolecular composite further comprises a cargo molecule.

As used herein, a "cargo molecule" or "cargo" is a molecule enclosed within or associated with a delivery system which may be delivered across the membrane of a cell or into the cytosol of a target cell by that delivery system. Membrane-based delivery systems such as liposomes allow for encapsulation of exogenous materials in the interior of the liposome, within the lipid membranes and on the exterior of the liposome. Likewise the biomolecular composites of the present invention allow for encapsulation of a cargo molecule in the interior, within the lipid membranes and on the exterior thereof. Encapsulation techniques are well understood by the skilled person in liposomal drug delivery systems and the same principles apply to biomolecular composites of the present invention. The nature of the cargo molecule depends on the purpose for which it is delivered. Accordingly, and depending on the purpose, cargo molecules include but are not limited to small molecules, amino acids, peptides, polypeptides, proteins, nucleic acids, expression cassettes comprising nucleic acids, antibodies, silica, carbon nanotubes, gold nanoparticles, silver nanoparticles, iron oxide, aptamers, dendrimers, imaging agents, electron dense materials, therapeutic agents, natural products and vaccines. The cargo molecule enclosed within or associated with a biomolecular composite of the present invention may be delivered to a target cell in vitro or in vivo.

In another preferred embodiment the cargo molecule is a polypeptide.

The terms "polypeptide", "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

In a preferred embodiment the cargo molecule is an antibody or fragment thereof. "Antibody" refers to a polypeptide comprising a framework region from an immunoglobulin gene or fragments thereof that specifically binds and recognizes an antigen. The recognized immunoglobulin genes include the kappa, lambda, alpha, gamma, delta, epsilon, and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD and IgE, respectively. Typically, the antigen binding region of an antibody will be most critical in specificity and affinity of binding. In some embodiments, antibodies or fragments of antibodies may be derived from different organisms, including humans, mice, rats, hamsters, camels, etc. Antibodies of the invention may include antibodies that have been modified or mutated at one or more amino acid positions to improve or modulate a desired function of the antibody (e.g. glycosylation, expression, antigen recognition, effector functions, antigen binding, specificity, etc.). Optionally, the cargo molecule is an antibody conjugate. Any method known in the art for conjugating an antibody to the label may be employed, e.g., using methods described in Hermanson, Bioconjugate Techniques 1996 Academic Press, Inc., San Diego.

In a preferred embodiment the cargo molecule is a nucleic acid molecule. In an embodiment the cargo molecule is an inhibitory nucleic acid. In an embodiment the inhibitory nucleic acid molecule is a siRNA, shRNA or a miRNA.

"Nucleic acid" or "oligonucleotide" or "polynucleotide" or grammatical equivalents used herein means at least two nucleotides covalently linked together. The term "nucleic acid" includes single-, double-, or multiple-stranded DNA, RNA and analogues (derivatives) thereof.

Oligonucleotides are typically from about 5, 6, 7, 8, 9, 10, 12, 15, 25, 30, 40, 50 or more nucleotides in length, up to about 100 nucleotides in length. Nucleic acids and polynucleotides are a polymers of any length, including longer lengths, e.g., 200, 300, 500, 1000, 2000, 3000, 5000, 7000, 10,000, etc. In certain embodiments the nucleic acids herein contain phosphodiester bonds. In other embodiments, nucleic acid analogues are included that may have alternate backbones, comprising, e.g., phosphoramidate, phosphorothioate, phosphorodithioate, or O-methylphosphoroamidite linkages (see Eckstein, Oligonucleotides and Analogues: A Practical Approach, Oxford University Press); and peptide nucleic acid backbones and linkages. Other analogue nucleic acids include those with positive backbones; non-ionic backbones, and non-ribose backbones, including those described in U.S. Pat. Nos. 5,235,033 and 5,034,506, and Chapters 6 and 7, ASC Symposium Series 580, Carbohydrate Modifications in Antisense Research, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogues can be made; alternatively, mixtures of different nucleic acid analogues, and mixtures of naturally occurring nucleic acids and analogues may be made.

An "inhibitory nucleic acid" is a nucleic acid (e.g. DNA, RNA, polymer of nucleotide analogues) that is capable of binding to a target nucleic acid (e.g. an mRNA translatable into PTPRS) and reducing transcription of the target nucleic acid (e.g. mmRNA from DNA) or reducing the translation of the target nucleic acid (e.g. mRNA) or altering transcript splicing (e.g. single stranded morpholino oligo). A "morpholino oligo" may be alternatively referred to as a "morpholino nucleic acid" and refers to morpholine-containing nucleic acid nucleic acids commonly known in the art (e.g. phosphoramidate morpholino oligo or a "PMO"). See Marcos, P (2007). In some embodiments, the "inhibitory nucleic acid" is a nucleic acid that is capable of binding (e.g. hybridizing) to a target nucleic acid (e.g. an mRNA translatable into a protein) and reducing translation of the target nucleic acid. The target nucleic acid is or includes one or more target nucleic acid sequences to which the inhibitory nucleic acid binds (e.g. hybridizes). Thus, an inhibitory nucleic acid typically is or includes a sequence (also referred to herein as an "antisense nucleic acid sequence") that is capable of hybridizing to at least a portion of a target nucleic acid at a target nucleic acid sequence. An example of an inhibitory nucleic acid is an antisense nucleic acid.

Another example of an inhibitory nucleic acid is siRNA or RNAi (including their derivatives or pre-cursors, such as nucleotide analogues). Further examples include shRNA, miRNA, shmiRNA, or certain of their derivatives or pre-cursors. The term "miRNA" refers to a microRNA molecule found in eukaryotes that is involved in gene regulation. See, for example, Carrington et al. (2003). In some embodiments, the inhibitory nucleic acid is single stranded. In other embodiments, the inhibitory nucleic acid is double stranded.

An "antisense nucleic acid" is a nucleic acid (e.g. DNA, RNA or analogues thereof) that is at least partially complementary to at least a portion of a specific target nucleic acid (e.g. a target nucleic acid sequence), such as an mRNA molecule (e.g. a target mRNA molecule) (see, e.g., Weintraub (1990)), for example antisense, siRNA, shRNA, shmiRNA, miRNA (microRNA). Thus, antisense nucleic acids are capable of hybridizing to (e.g. selectively hybridizing to) a target nucleic acid (e.g. target mRNA).

In some embodiments, the antisense nucleic acid hybridizes to the target nucleic acid sequence (e.g. mRNA) under stringent hybridization conditions. In some embodiments, the antisense nucleic acid hybridizes to the target nucleic acid (e.g. mRNA) under moderately stringent hybridization conditions. Antisense nucleic acids may comprise naturally occurring nucleotides or modified nucleotides such as, e.g. phosphorothioate, methylphosphonate, and anomeric sugar phosphate, backbone-modified nucleotides. Antisense nucleic acids may be single or double stranded nucleic acids.

In the cell, the antisense nucleic acids may hybridize to the target mRNA, forming a double-stranded molecule. The antisense nucleic acids interfere with the translation of the mRNA, since the cell will not translate an mRNA that is double-stranded. The use of antisense methods to inhibit the in vitro translation of genes is well known in the art (Marcus-Sakura (1988). Antisense molecules which bind directly to the DNA may be used.

In a preferred embodiment the cargo molecule is selected from the group consisting of silica, carbon nanotube, dendrimer, aptamer, albumin, an antibody-drug conjugate or combinations thereof.

In a preferred embodiment the cargo molecule is an imaging agent, a therapeutic agent or a combination thereof.

In a preferred embodiment the therapeutic agent is selected from the group consisting of analgesics, anaesthetics, analeptics, corticosteroid, anticholinergic agents, anticholinesterases, anticonvulsants, chemotherapeutic agents, allosteric inhibitors, anabolic steroids, antirheumatic agents, psychotherapeutic agents, neural blocking agents, anti-inflammatory agents, anthelmintics, antibiotics, anticoagulants, antifungals, antihistamines, antimuscarinic agents, antimycobacterial agents, antiprotozoal agents, antiviral agents, dopaminergics, haematological agents, immunological agents, muscarinics, protease inhibitors, vitamins, growth factors, and hormones.

By way of example, the cargo molecule can be a chemotherapeutic agent such as doxorubicin, a lytic peptide or siRNA or shRNA. Optionally, the cargo molecule can be a cancer vaccine, such as plasmids encoding molecules that up-regulate the recognition of tumour cells, or down-regulate factors that prevent the recognition of tumour cells. Optionally, the cargo molecule is an anti-inflammatory therapeutic to modulate the inflammation process in an inflammatory disease. Optionally, the cargo molecule is an imaging agent capable of visualization of tumour mass or inflammatory tissues.

In a preferred embodiment the imaging agent is selected from the group consisting of radioactive isotopes, iron oxide nanoparticles, gold nanoparticles, fluorescent dyes and near-infra-red dyes.

Optionally, the cargo molecule is a combination of a therapeutic agent and an imaging agent. The therapeutic agent and imaging agent can be separate or conjugated, e.g., a fluorescently labelled therapeutic antibody.

In a preferred embodiment the cargo molecule is an antigen with or without an appropriate adjuvant, designed to induce an immunological response for purposes of vaccination.

The biomolecular composites of the present invention typically comprise an internal space. In an embodiment the cargo is localized into the internal space of the biomolecular composite. In an embodiment the cargo is localized within the membranes of the biomolecular composites. In an embodiment the cargo is localized onto the membrane surface of the biomolecular composites. The cell ghosts also contain an internal space. In an embodiment the cargo is localized into the internal space of the cell ghosts.

Localization of cargo into the internal space of cell ghosts may be performed by addition of cargo into cell ghosts by immersing in solution of high cargo concentration dissolved in the hypotonic solution used in the preparation of cell ghosts. Optionally cargo can be added to the cell ghosts prior to addition to the lipids.

Loading of cargo into pre-formed liposomes may be done using methods established in the liposomal literature, including thin film hydration and remote loading methods.

The thin film hydration method of loading cargo may be applied in various ways. For example, a lipophilic drug or cargo may be added to lipids dissolved in an organic solvent and evaporated to dryness, leaving a thin film of lipids and drug. The thin film may then be hydrated with a suspension of cell ghosts before extrusion to form CVTs. Alternatively, a thin film comprising lipids may be produced and then hydrated in a suspension of cell ghosts and hydrophilic cargo, before extrusion to form CVTs.

In another example for loading via thin film hydration method, a thin film consisting of lipids is produced. Cell ghosts are loaded with a hydrophilic cargo by immersion in a solution containing a high concentration of said hydrophilic cargo during cell ghost formation. The suspension of cell ghosts loaded with cargo produced in this process is used to hydrate the lipid thin film, and the hydrated thin film is extruded to form CVTs.

In an example of loading via the remote loading method, a thin film of lipids is first produced. Cell ghosts are suspended in a solution of ammonium phosphate (typically 250 mM). The suspension is used to hydrate the lipid thin film before extrusion to form CVTs. The CVTs are dialyzed in a solution of PBS for buffer exchange, before addition of cargo molecules that will precipitate within the CVTs, such as doxorubicin hydrochloride, due to a transmembrane pH gradient. Cargo molecules that are not loaded within the CVTs are then removed via further dialysis.

In an embodiment biomolecular composites may be immersed in a solution of cargo molecule to load same. Optionally empty biomolecular composites may be loaded with an anionic cargo such as plasmids, peptides, nucleotides or genetic material by absorption to the membrane surface. In particular, CVTs with cationic lipid components, such as DOTAP (1,2-dioleoyl-3-trimethylammonium-propane) may be loaded in this way. Anionic cargo such as plasmids, peptides, nucleotides or genetic material is added to the CVTs, mixed and allowed to stand for at least 10 minutes to allow complexation of anionic cargo with the cationic CVTs. In another example of loading onto the surface of CVTs, CVTs with click chemistry components such as DSPE-PEG(2000)-DBCO (1,2-distearoyl-sn-glycero-3-phosphoethanolamine-N-[dibenzocyclooctyl(polyethylene glycol)-2000]) may be used. Cargo molecules labeled with an azide component may then be added to the CVTs and clicked onto the CVTs.

In a still further example of loading onto the surface of CVTs, CVTs with biotin functionalization such as lipids functionalized with biotin (1,2-dipalmitoyl-sn-glycero-3-phosphoethanolamine-N-(biotinyl)) may be used. Therapeutics labeled with a streptavidin component may then be added to the CVTs and attached to the CVTs due to the strong propensity for biotin to bind streptavidin.

In yet another example of loading onto the surface of CVTs, CVTs may be crossed linked with proteins or peptide via carbodiimide chemistry. A CVT with carboxylic acid groups on a protein derived from the cell ghost membrane will crosslink with a cargo molecule bearing a primary amine group via carbodiimide bond formation. Alternatively a CVT bearing primary amine groups on a protein derived from the cell ghost membrane will crosslink with a cargo molecule bearing a carboxylic acid group via carbodiimide bond formation.

The biomolecular composite mentioned of the present invention may be formulated a pharmaceutical composition when it carries a therapeutic agent as a cargo molecule. Thus the invention provides a pharmaceutical composition comprising a biomolecular composite as described herein, further comprising a cargo molecule which is a therapeutic agent, and a pharmaceutically acceptable carrier.

By "pharmaceutically acceptable carrier" is meant a material that is not biologically or otherwise undesirable, i.e., the material is administered to a subject without causing undesirable biological effects or interacting in a deleterious manner with the other components of the pharmaceutical composition in which it is contained.

As used herein, the term "pharmaceutically acceptable" is used synonymously with "physiologically acceptable" and "pharmacologically acceptable". A pharmaceutical composition will generally comprise agents for buffering and preservation in storage, and can include buffers and carriers for appropriate delivery, depending on the route of administration.

A pharmaceutically acceptable carrier may be selected with due regard to the intended route of administration and standard pharmaceutical practice. Suitable pharmaceutical formulations may be found in, for example, Remington *The Science and Practice of Pharmacy,* 19th ed., Mack Printing Company, Easton, Pennsylvania (1995). The preparation of suitable formulations may be achieved routinely by the skilled person using routine techniques and/or in accordance with standard and/or accepted pharmaceutical practice.

In an embodiment the pharmaceutically acceptable carrier is an aqueous carrier. A variety of aqueous carriers can be used, e.g., buffered saline and the like. These solutions are sterile and generally free of undesirable matter. These compositions may be sterilized by conventional, well known sterilization techniques. The compositions may contain pharmaceutically acceptable auxiliary substances as required to approximate physiological conditions such AS pH adjusting and buffering agents, toxicity adjusting agents and the like, for example, sodium acetate, sodium chloride, potassium chloride, calcium chloride, sodium lactate and the like. The concentration of active agent in these formulations can vary widely, and will be selected primarily based on fluid volumes, viscosities, body weight and the like in accordance with the particular mode of administration selected and the subject's needs.

For parenteral administration, a parenterally acceptable aqueous solution may be employed, which is pyrogen free and has requisite pH, isotonicity, and stability. For example, the solution should be suitably buffered and the liquid diluent first rendered isotonic with sufficient saline or glucose. Aqueous solutions, in particular, sterile aqueous media, are especially suitable for intravenous, intramuscular, subcutaneous and intraperitoneal administration. Suitable solutions will be well known to the skilled person, with numerous methods being described in the literature. A brief review of methods of drug delivery may also be found in e.g. Langer, *Science* (1990) 249, 1527.

A parenteral formulation (such as a solution or suspension for injection or a solution for infusion) may contain from 1 to 50% (w/w) active ingredient; and from 50% (w/w) to 99% (w/w) of a liquid or semisolid carrier or vehicle (e.g. a solvent such as water); and 0-20% (w/w) of one or more other excipients such as buffering agents, antioxidants, suspension stabilisers, tonicity adjusting agents and preservatives.

Depending on the disorder, and the patient, to be treated, as well as the route of administration, formulations of the present invention may be administered at varying therapeutically effective doses to a patient in need thereof. The amount of biomolecular composite and/or cargo molecule in any pharmaceutical formulation used in accordance with the present invention will depend on various factors, such as the nature of the cargo molecule, the nature of the disorder to be treated, the severity of the condition to be treated, the particular patient to be treated, as well as the compound(s) which is/are employed as cargo. In any event, the amount of cargo molecule in the formulation may be determined routinely by the skilled person.

However, the dose administered to a mammal, particularly a human, in the context of the present invention should be sufficient to effect a therapeutic response in the mammal over a reasonable timeframe. One skilled in the art will recognize that the selection of the exact dose and composition and the most appropriate delivery regimen will also be influenced by inter alia the pharmacological properties of the formulation, the nature and severity of the condition being treated, and the physical condition and mental acuity of the recipient, as well as the potency of the specific compound, the age, condition, body weight, sex and response of the patient to be treated, and the stage/severity of the disease.

The formulations of compounds can be presented in unit-dose or multi-dose sealed containers, such as ampules and vials. Thus, the composition can be in unit dosage form. In such form the preparation is subdivided into unit doses containing appropriate quantities of the active component. Thus, the compositions can be administered in a variety of unit dosage forms depending upon the method of administration.

The biomolecular composites according to the invention may be provided in the form of a kit. Such a kit may comprise (a) a biomolecular composite as described herein or a pharmaceutical composition comprising the biomolecular composite, wherein the biomolecular composite further comprises a cargo molecule and, preferably, (b) instructions for use.

In an embodiment, the kit comprises of freeze-dried versions of the biomolecular composites to enable a longer shelf-life. The freeze-dried biomolecular composites are activated via addition of a suitable buffer and used in its re-constituted form.

In an embodiment the kit comprises one or more additional agents for treating or preventing one or more symptoms of a disease.

In an embodiment the kit comprises a means of administering the composition, such as, for example, a syringe, needle, tubing, catheter, patch, and the like. The kit may also comprise formulations and/or materials requiring sterilization and/or dilution prior to use.

Alternatively, a kit in accordance with the present invention may comprise (a) a biomolecular composite as described herein or a pharmaceutical composition comprising the biomolecular composite (b) a cargo molecule and, preferably, (c) instructions for use.

In a preferred embodiment the kit comprises a means of loading the cargo molecule into the biomolecular composite.

In another preferred embodiment the kit comprises one or more additional agents for treating or preventing one or more symptoms of a disease.

In an embodiment the kit comprises a means of administering the composition, such as, for example, a syringe, needle, tubing, catheter, patch, and the like. The kit may also comprise formulations and/or materials requiring sterilization and/or dilution prior to use.

Alternatively, a kit in accordance with the present invention may comprise (a) a cell ghost (b) lipids and/or a vesicular structure or components thereof (c) a cargo molecule and (d) instructions for use.

Preferably in b) the lipids and/or vesicular structure are fusogenic lipids and/or a fusogenic liposome which comprises a lipid bilayer in spherical disposition.

In a preferred embodiment the kit comprises means of fusing cell ghosts with fusogenic liposomes.

In another preferred embodiment the kit comprises a means of loading the cargo molecule into the biomolecular composite.

In another embodiment the kit provides a laboratory reagent in the form of a biomolecular composite as described herein that may, for example, act as a transfection reagent to deliver cargo molecules to a cell target. In this respect, the cargo molecule could be an expression construct or vector, protein, nucleic acid or any other molecule suitable for transfection.

In another embodiment the kit comprises one or more additional agents for treating or preventing one or more symptoms of a disease.

In another embodiment the kit comprises a means of administering the composition, such as, for example, a syringe, needle, tubing, catheter, patch, and the like. The kit may also comprise formulations and/or materials requiring sterilization and/or dilution prior to use.

The biomolecular composite of the present invention may be utilised in a method of medical treatment when it carries a therapeutic agent as a cargo molecule. Accordingly, the present invention provides a method for the treatment of a disease or condition in a patient in need of such treatment comprising administering to the patient an effective amount of a biomolecular composite as described herein, wherein said biomolecular composite further comprises a cargo molecule which is a therapeutic agent for the treatment of said disease or condition.

For the avoidance of doubt, in the context of the present invention, the terms "treat", "treating" or "treatment" includes references to therapeutic or palliative treatment of patients in need of such treatment, as well as to the prophylactic treatment and/or diagnosis of patients which are susceptible to the relevant disease states.

The terms "patient" and "patients" include references to mammalian (e.g. human) patients.

The term "effective amount" refers to an amount of a compound, which confers a therapeutic effect on the treated patient (e.g. sufficient to treat or prevent the disease). The effect may be objective (i.e. measurable by some test or marker) or subjective (i.e. the patient gives an indication of or feels an effect). The terms "effective amount" and "effective dosage" may be used interchangeably.

The present invention also provides a biomolecular composite as described herein, wherein said biomolecular composite further comprises a cargo molecule which is a therapeutic agent, for use in therapy.

The present invention provides further the use of a biomolecular composite as described herein, wherein said biomolecular composite further comprises a cargo molecule which is a therapeutic agent, in the manufacture of a medicament for use in therapy.

The present invention provides still further a biomolecular composite as described herein wherein said biomolecular composite further comprises a cargo molecule which is a therapeutic agent, when used in therapy.

Administration of the biomolecular composites loaded with a therapeutic agent treat the disease, or one or more symptoms of the disease, in the patient. In an embodiment the disease is selected from the group consisting of autoimmune disease, developmental disorder, inflammatory disease, metabolic disorder, cardiovascular disease, liver disease, intestinal disease, infectious disease, endocrine disease, neurological disorder, and cancer.

In an embodiment the biomolecular composite is loaded with a therapeutic agent for the treatment of cancer. In an embodiment the cancer is selected from the group consisting of adrenal cancer, anal cancer, bile duct cancer, bladder cancer, bone cancer, brain tumours, CNS tumours, breast cancer, Castleman disease, cervical cancer, colon cancer, rectum cancer, endometrial cancer, oesophagus cancer, eye cancer, gallbladder cancer, gastrointestinal carcinoid tumours, gastrointestinal stromal tumour (GIST), gestational trophoblastic disease, Hodgkin disease, Kaposi sarcoma, kidney cancer, laryngeal cancer, hypopharyngeal cancer, leukaemia (e.g. acute lymphocytic, acute myeloid, chronic lymphocytic, chronic myeloid, chronic myelomonocytic), liver cancer, lung cancer (e.g. small cell or non-small cell), lung carcinoid tumour, lymphoma (e.g. of the skin), malignant mesothelioma, multiple myeloma, myelodysplastic syndrome, nasal cavity cancer, paranasal sinus cancer, nasopharyngeal cancer, neuroblastoma, non-Hodgkin lymphoma, oral cavity cancer, oropharyngeal cancer, osteosarcoma, ovarian cancer, pancreatic cancer, penile cancer, pituitary tumours, prostate cancer, retinoblastoma, rhabdomyosarcoma, salivary gland cancer, sarcoma, skin cancer (basal and squamous cell, melanoma, Merkel cell), small intestine cancer, stomach cancer, testicular cancer, thymus cancer, thyroid cancer, uterine sarcoma, vaginal cancer, vulvar cancer, Waldenstrom macroglobulinemia and Wilms tumour).

In an embodiment the biomolecular composite is loaded with a therapeutic agent for the treatment of an infectious disease. In particular the therapeutic agent is or the treatment of infectious diseases in caused by infection with bacteria, protozoa, viruses, prions, fungi or helminths. In particular, cells infected by bacteria, viruses, prions, fungi and helminths, resulting in an expression of protein markers or materials on the infected cell surface, are a target for drug loaded CVTs. By way of example, hepatitis B infected liver cells express protein markers from the hepatitis B virus which can be targeted by CVTs.

Therapeutic agents may be selected for the treatment bacterial infections or protozoan infections which include the following: pneumonia, otitis media, sinusitis, bronchitis, tonsillitis, and mastoiditis related to infection by *Streptococcus pneumoniae, Haemophilus influenzae, Moraxella catarrhalis, Staphylococcus aureus, Enterococcus faecalis, E. faecium, E. casselflavus, S. epidermidis, S. haemolyticus*, or *Peptostreptococcus* spp.; pharyngitis, rheumatic fever, and glomerulonephritis related to infection by *Streptococcus pyogenes*, Groups C and G streptococci, *Corynebacterium diphtheriae*, or *Actinobacillus haemolyticum*; respiratory tract infections related to infection by *Mycoplasma pneumoniae, Legionella pneumophila, Streptococcus pneumoniae, Haemophilus influenzae*, or *Chlamydia pneumoniae*; blood and tissue infections, including endocarditis and osteomyelitis, caused by *S. aureus, S. haemolyticus, E. faecalis, E. faecium, E. durans*; uncomplicated skin and soft tissue infections and abscesses, and puerperal fever related to infection by *Staphylococcus aureus*, coagulase-negative staphylococci (i.e., *S. epidermidis, S. hemolyticus*, etc.), *Streptococcus pyogenes, Streptococcus agalactiae*, Streptococcal groups C-F (minute-colony streptococci), *viridans* streptococci, *Corynebacterium minutissimum, Clostridium* spp., or *Bartonella henselae*; uncomplicated acute urinary tract infections related to infection by *Staphylococcus aureus*, coagulase-negative staphylococcal species, or *Enterococcus* spp.; urethritis and cervicitis; sexually transmitted diseases related to infection by *Chlamydia trachomatis, Haemophilus ducreyi, Treponema pallidum, Ureaplasma urealyticum*, or *Neiserria gonorrheae*; toxin diseases related to infection by *S. aureus* (food poisoning and toxic shock syndrome), or Groups A, B, and C streptococci; ulcers related to infection by *Helicobacter pylori*; systemic febrile syndromes related to infection by *Borrelia recurrentis*; Lyme disease related to infection by *Borrelia burgdorferi*; conjunctivitis, keratitis, and dacrocystitis related to infection by *Chlamydia trachomatis, Neisseria gonorrhoeae, S. aureus, S. pneumoniae, S. pyogenes, H. influenzae*, or *Listeria* spp.; disseminated *Mycobacterium avium* complex (MAC) disease related to infection by *Mycobacterium avium*, or *Mycobacterium intracellulare*; infections caused by *Mycobacterium tuberculosis, M. leprae, M. paratuberculosis, M. kansasii*, or *M. chelonei*; gastroenteritis related to infection by *Campylobacter jejuni*; intestinal protozoa related to infection by *Cryptosporidium* spp.; odontogenic infection related to infection by *Viridans* streptococci; persistent cough related to infection by *Bordetella pertussis*; gas gangrene related to infection by *Clostridium perfringens* or *Bacteroides* spp.; and atherosclerosis or cardiovascular disease related to infection by *Helicobacter pylori* or *Chlamydia pneumoniae*. Bacterial infections and protozoan infections, and disorders related to such infections, which may be treated or prevented in animals include the following: bovine respiratory disease related to infection by *P. haemolytica, P. multocida, Mycoplasma bovis*, or *Bordetella* spp.; cow enteric disease related to infection by *E. coli* or protozoa (i.e., coccidia, cryptosporidia, etc.); dairy cow mastitis related to infection by *S. aureus*, Strep. *uberis, Streptococcus agalactiae, Streptococcus dysgalactiae, Klebsiella* spp., *Corynebacterium*, or *Enterococcus* spp.; swine respiratory disease related to infection by *A. pleuro., P. multocida*, or *Mycoplasma* spp.; swine enteric disease related to infection by *E. coli, Lawsonia intracellularis, Salmonella*, or *Serpulina hyodysinteriae*; cow footrot related to infection by *Fusobacterium* spp.; cow metritis related to infection by *E. coli*; cow hairy warts related to infection by *Fusobacterium necrophorum* or *Bacteroides nodosus*; cow pink-eye related to infection by *Moraxella bovis*; cow premature abortion related to infection by protozoa (i.e. neosporium); urinary tract infection in dogs and cats related to infection by *E. coli*; skin and soft tissue infections in dogs and cats related to infection by *S. epidermidis, S. intermedius*, coagulase neg. *Staphylococcus* or *P. multocida*; and dental or mouth infections in dogs and cats related to infection by *Alcaligenes* spp., *Bacteroides* spp., *Clostridium* spp., *Enterobacter* spp., *Eubacterium, Peptostreptococcus, Porphyromonas*, or *Prevotella*.

Therapeutic agents may be selected for the treatment of infections with viruses including viruses belonging to Herpesviridae such as herpes simplex virus type 1 (HSV-1), herpes simplex virus type 2 (HSV-2), varicella-zoster virus (VZV), and cytomegalovirus (CMV) (collectively called the herpes virus), viruses belonging to Orthomyxoviridae such as influenza A virus, influenza B virus, and influenza C virus (collectively called the influenza virus), viruses belonging to Retroviridae such as human immunodeficiency virus (HIV), viruses belonging to Paramyxoviridae such as measles virus and mumps virus, viruses belonging to Picornaviridae such as poliovirus, rhinovirus, and hepatitis A virus, viruses belonging to Hepadnaviridae such as hepatitis B virus, viruses belonging to Flaviviridae such as hepatitis C virus, Japanese encephalitis virus, and West Nile virus, viruses belonging to Adenoviridae such as human adenovirus C, viruses belonging to Coronaviridae such as corona virus and SARS virus, viruses belonging to Togaviridae such as rubella virus, viruses belonging to Rhabdoviridae such as rabies virus and vesicular stomatitis alagoas virus, viruses belonging to Filoviridae such as Ebola virus, and viruses belonging to Papovaviridae such as human papillomavirus (HPV).

Therapeutic agents may be selected for the treatment of infections caused by prions including various spongiform encephalopathies. A typical prion disease in animals is scrapie, which occurs in sheep and goats. Human prion diseases include Creutzfeldt-Jakob disease, Gerstmann-Sträussler-Scheinker syndrome, Kuru and fatal familial insomnia.

Therapeutic agents may be selected for the treatment of fungal infections including those caused by a fungus selected from the group consisting of a *Candida* spp., a *Cryptococcus* spp., an *Aspergillus* spp., a *Nocardia* spp., and a *Saccharomyces* spp. The fungal infection can be caused by a member of the *Candida* spp. selected from the group consisting of *Candida albicans, Candida glabrata, Candida parapsilosis, Candida dubliensis, Candida tropicalis, Candida lusitaniae, Candida pseudoguillerimondi*, and *Candida krusei*. Optionally the fungal infection can be caused by a member of the *Cryptococcus* spp., for example, *Cryptococcus neoformans*.

Therapeutic agents may be selected for the treatment of helminth infections including those caused by one or more helminths selected from the group consisting of cestodes: e.g. *Anaplocephala* spp., *Dipylidium* spp., *Diphyllobothrium* spp., *Echinococcus* spp., *Moniezia* spp. or *Taenia* spp.; trematodes e.g. *Dicrocoelium* spp., *Fasciola* spp., *Paramphistomum* spp. or *Schistosoma* spp.; or nematodes, e.g; *Ancylostoma* spp., *Anecator* spp., *Ascaridia* spp., *Ascaris* spp., *Brugia* spp., *Bunostomum* spp., *Capillaria* spp., *Chabertia* spp., *Cooperia* spp., *Cyathostomum* spp., *Cylicocyclus* spp., *Cylicodontophorus* spp., *Cylicostephanus* spp., *Craterostomum* spp., *Dictyocaulus* spp., *Dipetalonema* spp, *Dirofilaria* spp., *Dracunculus* spp., *Enterobius* spp., *Filaroides* spp., *Habronema* spp., *Haemonchus* spp., *Heterakis* spp., *Hyostrongylus* spp., *Metastrongylus* spp., *Meullerius* spp. *Necator* spp., *Nematodirus* spp., *Nippostrongylus* spp., *Oesophagostomum* spp., *Onchocerca* spp., *Ostertagia* spp., *Oxyuris* spp., *Parascaris* spp., *Stephanurus* spp., *Strongylus* spp., *Syngamus* spp., *Toxocara* spp., *Strongyloides* spp., *Teladorsagia* spp., *Toxascaris* spp., *Trichinella* spp., *Trichuris* spp., *Trichostrongylus* spp., *Triodontophorous* spp. or *Uncinaria* spp.

According to the methods provided herein, the patient is administered an effective amount of one or more of the agents provided herein. Effective amounts and schedules for administering the agent may be determined empirically by one skilled in the art. The dosage ranges for administration are those large enough to produce the desired effect in which one or more symptoms of the disease or disorder are affected (e.g. reduced or delayed). The dosage should not be so large as to cause substantial adverse side effects, such as unwanted cross-reactions, anaphylactic reactions, and the like. Generally, the dosage will vary with the age, condition, sex, type of disease, the extent of the disease or disorder, route of administration, or whether other drugs are included in the regimen, and can be determined by one of skill in the art. The dosage can be adjusted by the individual physician in the event of any contraindications. Dosages can vary and can be administered in one or more dose administrations daily, for one or several days. Guidance can be found in the literature for appropriate dosages for given classes of pharmaceutical products. For example, for the given parameter, an effective amount will show an increase or decrease of at least 5%, 10%, 20%, 30%, 50%, 70%, 90% or 100%.

Efficacy can also be expressed as "-fold" increase or decrease. For example, a therapeutically effective amount can have at least a 1.2-fold, 1.5-fold, 2-fold, 5-fold, or more effect over a control. The exact dose and formulation will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Remington: The Science and Practice of Pharmacy, 20th Edition, Gennaro, Editor (2003), and Pickar, Dosage Calculations (1999)).

The applications of biomolecular composites according to the invention are numerous depending on the nature of the material to be loaded. A number of possible applications in therapy are discussed herein for illustrative purposes only, and the skilled person will appreciate that other applications are possible, such as in the laboratory as a cargo delivery vehicle or transfection reagent, and are not excluded.

By way of example, chemotherapeutics may be loaded in biomolecular composites according to the invention. These may be small molecules such as doxorubicin, protein/peptide based therapeutics such as lytic peptides or genetic material such as siRNA or shRNA. As a result of the nano dimensions of the nCVTs, nCVTs loaded with chemotherapeutics can accumulate at tumour sites using the EPR effect. At the tumour site, nCVTs have an improved cellular uptake profile by tumour cells and enhanced targeting to tumour cells, reducing collateral toxicity to otherwise healthy cells, due to the presence cell derived components from a cell ghost that inherently targets the tumour cells.

In an embodiment, the biomolecular composites may deliver cancer vaccines. Plasmids encoding for instructions to up-regulate the recognition of tumour cells, or down-regulate factors that prevent the recognition of tumour cells may be loaded onto CVTs. By enhancing natural immunosurveillance in this way, the body's natural immune system may be able to mount a more effective removal of cancer cells.

The biomolecular composites are also useful in immunotherapy. Cell ghosts from tumour cells that present tumour ligands on their surface may be produced. Cell ghosts from cells that have been infected by pathogens, whether viral or bacterial, that present pathogenic ligands on their surface may be also produced. These cell ghosts may be further modified into CVTs, to increase the surface expression of these ligands or proteins, before addition to a pool of T cells for activation and expansion of the T cell population in recognition of these ligands. The expanded T cells may then be purified and reintroduced back to the patient for immunotherapy.

Alternatively, the CVTs may be rendered nCVTs, and loaded with a therapeutic agent as cargo before being reintroduced to the patient for immunotherapy.

The biomolecular composites may be useful in gene therapy. CVTs may be adapted for the delivery of genetic material by loading with a suitable plasmid.

The biomolecular composites may be useful in modulation of inflammation. Inflammatory diseases including but not limited to inflammatory bowel disease, rheumatoid arthritis, peritonitis, atherosclerosis and myopathies may be treated with anti-inflammatory biotherapeutics or therapeutics to modulate the inflammation process. These disease states may be treated more efficiently with less collateral toxicity by using CVTs produced from a cell ghost derived from a cell with intrinsic ability to target inflammation and loading it with a therapeutic agent for inflammation.

Additional therapeutic agents suitable to treat the disease being treated may be used in conjunction with the therapeutic agent loaded in a biomolecular composite. Thus, in some embodiments, the provided methods of treatment further comprise administering a second therapeutic agent to the subject. Suitable additional therapeutic agents include, but are not limited to, therapeutic agent is selected from the group consisting of analgesics, anaesthetics, analeptics, corticosteroids, anticholinergic agents, anticholinesterases, anticonvulsants, antineoplastic agents, allosteric inhibitors, anabolic steroids, antirheumatic agents, psychotherapeutic agents, neural blocking agents, anti-inflammatory agents, anthelmintics, antibiotics, anticoagulants, antifungals, antihistamines, antimuscarinic agents, antimycobacterial agents, antiprotozoal agents, antiviral agents, dopaminergics, haematological agents, immunological agents, muscarinics, protease inhibitors, vitamins, growth factors, and hormones. The choice of agent and dosage can be determined readily by one of skill in the art based on the given disease being treated.

Combinations of agents or compositions can be administered either concomitantly (e.g., as a mixture), separately but simultaneously (e.g., via separate intravenous lines) or sequentially (e.g., one agent is administered first followed by administration of the second agent). Thus, the term combination is used to refer to concomitant, simultaneous or sequential administration of two or more agents or compositions. The course of treatment is best determined on an individual basis depending on the particular characteristics of the patient and the type of treatment selected.

The treatment, such as those disclosed herein, can be administered to the patient on a daily, twice daily, bi-weekly, monthly or any applicable basis that is therapeutically effective. The treatment can be administered alone or in combination with any other treatment disclosed herein or known in the art. The additional treatment can be administered simultaneously with the first treatment, at a different time, or on an entirely different therapeutic schedule (e.g., the first treatment can be daily, while the additional treatment is weekly).

The biomolecular composite mentioned of the present invention may be utilised in a method of medical diagnosis when it carries an imaging agent as a cargo molecule. Thus the present invention provides a method of diagnosing a disease in a subject comprising administering to the subject a biomolecular composite as described herein wherein said biomolecular composite further comprises a cargo molecule which is an imaging agent.

The term "diagnosis" refers to a relative probability that a disease (e.g. an autoimmune, inflammatory autoimmune, cancer, infectious, immune, or other disease) is present in the subject. Similarly, the term "prognosis" refers to a relative probability that a certain future outcome may occur in the subject with respect to a disease state. For example, in the context of the present invention, prognosis can refer to the likelihood that an individual will develop a disease (e.g. an autoimmune, inflammatory autoimmune, cancer, infectious, immune, or other disease), or the likely severity of the disease (e.g., duration of disease). The terms are not intended to be absolute, as will be appreciated by any one of skill in the field of medical diagnostics.

Diagnostic methods generally involve comparing the levels or activity of a biomarker, e.g., intracellular target of a disease, from a test sample to a control sample. A control sample or value refers to a sample that serves as a reference, usually a known reference, for comparison to a test sample. A control can also represent an average value gathered from a population of similar individuals, e.g., cancer patients or healthy individuals with a similar medical background, same age, weight, etc. A control value can also be obtained from the same individual, e.g., from an earlier-obtained sample, prior to disease, or prior to treatment. The terms "comparing", "correlating" and "associated", in reference to determination of a disease risk factor, refers to comparing the presence or amount of the risk factor (e.g., amount of intracellular target of a disease) in an individual to its presence or amount in persons known to suffer from, or known to be at risk of disease, or in persons known to be free of disease, and assigning an increased or decreased probability of having/developing the disease to an individual based on the assay result(s).

A number of possible applications in diagnostic methods are discussed herein for illustrative purposes only, and the skilled person will appreciate that other applications are possible and are not excluded.

Imaging materials that may be introduced thereto include but are not limited to contrast material, radioactive isotopes, iron oxide nanoparticles, gold nanoparticles, fluorescent dyes and near-infra-red dyes may be incorporated in biomolecular composites according to the invention. Utilizing the intrinsic targeting ability of CVTs, visualization of tumour mass or inflammatory tissues may be done by accurately and with lower toxicity. The encapsulation of imaging materials within CVTs reduced contact of the imaging material with the body natural defence systems, lowering the risk of associated immunogenicity. In addition, CVTs may aid in the removal of these imaging materials once visualization has been obtained, circumventing issues of bio-accumulation in the body.

The combination of either biotherapeutics or therapeutics with an imaging component in biomolecular composites according to the invention allow for a theranostic approach towards treatment of disease states. For example, a tumour could be visualized and treated at the same time, allowing for clinicians to monitor the progress and effectiveness of the chosen therapy.

The biomolecular composite mentioned of the present invention may be utilised to carry exogenous material into a cell for other purposes including, but not limited to, cell transfection. Thus the present invention provides a method of introducing exogenous material to an isolated cell comprising contacting the isolated cell with a biomolecular composite comprising a cargo molecule as described herein.

In a preferred embodiment the biomolecular composite is a mCVT.

In a preferred embodiment the cargo molecule is a nucleic acid and the purpose is to stably or transiently transfect the isolated cell.

By way of example, mCVTs produced with cationic lipids associate with the negatively charged cargo. Accordingly incubation of such mCVTs with plasmids, nucleic acids, siRNAs, or shRNAs, typically for 10 minutes at room temperature, loads the biomolecular composite. The biomolecular composite is then added to cells for transfection. This typically occurs over 6 to 8 hours in a serum free culture medium Serum free culture medium is then replaced with a complete culture medium. The transfected cells are ready for use in 24-48 hours. Alternatively, mCVTs produced with cationic lipids are loaded with magnetic nanoparticles, such as iron oxide nanoparticles. The mCVTs are then incubated with plasmids, nucleic acids, siRNAs or shRNAs, typically for 10 minutes at room temperature. The loaded mCVTs are then added to cells for transfection. A magnet may be placed under the cell culture flask in order to draw the magnetic mCVTs to the bottom of the cell culture flasks, where the cells are adherent, thereby increasing the contact with the cells and improving transfection. A further alternative is for cells to be added to a microfluidic device together with the mCVTs, where the cells are squeezed in a microchannel constriction and subsequently relaxed. The expansion of the cell following the relaxation step results in an increased porosity of the cell membranes, facilitating the entry of mCVTs and thereby increasing transfection. Still further, cells may be added to an electroporation device together with the mCVTs, where the contents are electroporated. During electroporation, a transient increase in cell membrane porosity facilitates the entry of mCVTs, further improving transfection of the cells. In a still further alternative, cells may be added to a sonoporation device together with the mCVTs, where the contents are sonoporated. During sonoporation, a transient increase in cell membrane porosity facilitates the entry of mCVTs, further improving transfection of the cells.

Cells that may be transfected include primary and immortalized cell lines from brain, eye, blood, connective, fat, lungs, liver, spleen, kidney, stomach, colon, intestines, reproductive organs, skin, dental, hair follicles, bone, marrow, muscle and stem cells, including their cancerous forms, and in particular pre-adipocytes, macrophages, monocytes stem cells and. Chinese hamster ovary (CHO) cells.

A related aspect of the present invention provides a method of manufacturing a biomolecular composite as described above comprising the steps of:

(a) providing at least one cell;
(b) removing all or substantially all of the cytosolic contents of the cell including the nucleus and nuclear contents by exposing the cell to an osmotically active solution that is hypotonic to the cell;
(c) re-sealing the cell in isotonic solution to form a cell ghost;
(d) forming the biomolecular composite by shearing said cell ghost, extruding the cell ghost, or by freeze thawing and sonicating the cell ghost, under conditions that effect a size reduction to a hydrodynamic diameter of less than 6 μm, preferably in a range from about 5 μm to about 50 nm.

In a preferred embodiment the biomolecular composite further comprises lipids incorporated into said composite, said method comprising the steps of:

(a) providing at least one cell ghost defined in step (c) supra;
(b) contacting the at least one cell ghost with lipids and/or a vesicular structure; and
(c) fusing the lipids and/or vesicular structure with the cell ghost by shearing, extrusion, or by freeze thawing and sonicating the cell ghost, lipids and/or vesicular structure together under conditions that effect a size reduction to a hydrodynamic diameter of less than 6 μm, preferably in a range from about 5 μm to about 50 nm.

In a preferred embodiment the re-sealing or fusing is performed in isotonic medium.

In a preferred embodiment the lipids which are incorporated into said composite are conjugated to one or more molecules, such as but not limited to peptides, proteins, DNA, miRNA, siRNA, carbohydrates, biotin, streptavidin, avidin, fluorescent probes, azide groups, alkyne groups and components of carbodiimide chemistry.

In a preferred embodiment the lipids which are incorporated into said composite comprise labels or tags.

In a preferred embodiment the present invention provides a method of manufacturing a biomolecular composite comprising the steps of: (a) providing at least one vesicular structure composed of amphipathic molecules or the components thereof; (b) providing at least one cell ghost; and (iii) forming the biomolecular composite by admixing the vesicular structure composed of amphipathic molecules or components thereof with the cell ghost under conditions which induce fusion.

In a preferred embodiment of the method, said cell ghost and/or said vesicular structure contain a cargo molecule.

In an embodiment micro Cell Vesicle Technology (mCVTs) are produced. These are generally greater than 500 nm in diameter. An indicative size range for mCVTs is from 1 μm to 5 μm in diameter. In an embodiment the size range for mCVTs is from 3 μm to 4 μm in diameter as typically produced using methods such as freeze thawing. In an embodiment the size range of mCVTs is from 1 μm to 2 μm in diameter, as typically produced using methods such extrusion.

In an embodiment cell ghosts are added to pre-formed liposomes. In an alternative embodiment cell ghosts are encapsulated within giant liposomes. This may be achieved using lipid thin film hydration as described herein. In a still further embodiment cell ghosts are simply added to a mixture of lipids capable of assembling into a liposome.

In an embodiment the cell ghost can be purified prior to fusing with the liposomes.

Optionally, the purification comprises size exclusion column chromatography, dialysis, high performance liquid chromatography, ultra-high performance liquid chromatography, affinity-based columns, or a combination thereof.

In an embodiment the provided methods the liposomes and cell ghosts may be provided in a mass:mass ratio of 10:1, 9:1, 8:1, 7:1, 6:1, 5:1, 4:1, 3:1 2:1, 1:1, 1:2, 1:3, 1:4, 1:5, 1:6, 1:7, 1:8, 1:9, and 1:10.

In an embodiment fusion is induced by methods including but not limited to electroporation, extrusion, centrifugal force, passage through micro-channels and freeze thaw cycles.

In an embodiment the mixture is sonicated following addition of cell ghosts to a mixture of lipids capable of forming liposomes.

In an embodiment the mixture is freeze thawed, optionally for multiple cycles. Typically it is cycled between immersion in liquid nitrogen and room temperature, preferably for from 3 to 7 cycles, typically 5 cycles.

In an embodiment the mixture is passed through an extruder consisting of membranes with progressively reducing pore sizes. By way of example, extrusion may be through a membrane with a pore size of from 3 to 7 μm, preferably 5 μm. Optionally, the mixture is extruded multiple times, preferably from 3 to 7 times, typically 5 times. In an embodiment the mixture is then passed through an extruder consisting of membranes with a pore size of 1 μm. Optionally, the mixture is extruded multiple times, preferably from 3 to 9 times, typically 7 times.

In an embodiment the mixture is passed through an extruder consisting of membranes with progressively reducing pore sizes or having the same pore size. By way of example, extrusion may be through a single membrane with a pore size of from 3 to 10 μm, preferably 8 μm. In these embodiments, the mixture may be extruded multiple times, preferably from 3 to 9 times, typically from 5 to 7 times.

In an embodiment nano Cell Vesicle Technology (nCVTs) are produced. In this embodiment mCVTs are rendered into nano dimensions by methods including but not limited to extrusion, centrifugal force, passage through micro-channels, freeze thaw and/or sonication cycles. The indicative size range of nCVTs is less than 500 nm, usually 50 nm to 250 nm in diameter. In an embodiment nCVTs are from 100 to 200 nm in diameter.

By way of example a mCVT prepared using extrusion techniques is passed through a further extruder consisting of membrane pore size of 0.5 μm. Optionally, the mixture is extruded multiple times, preferably from 3 to 9 times, typically 7 times. The mixture is then passed through an extruder consisting of membrane pore size of 0.2 μm. Optionally, the mixture is extruded multiple times, preferably from 3 to 9 times, typically 7 times. The resultant fused biomolecules are termed nCVTs.

In an embodiment the particle size of a sonicated mixture of cell ghosts and liposome is reduced by centrifugation through spin cups with progressively reducing pore size. In an embodiment the mixture is added to a spin cup fitted with a 10 μm membrane pore size filter. The mixture is centrifuged. Preferably, the mixture is centrifuged at a g force in the range of about 14,000 G to about 15,000 G. In an embodiment the flow through is reintroduced to the spin cup and the abovementioned process is repeated. The mixture is then added to a spin cup with an 8 μm membrane pore size filter. The mixture is centrifuged. The flow through is reintroduced to the spin cup. In an embodiment the abovementioned process is repeated. In an embodiment the flow through is then added to a size exclusion column. Fractions containing the purified fraction were collected.

In an embodiment the vesicular structure is a micelle. Fusion with a micelle results in a biomolecular composite less than 50 nm in diameter.

While not wishing to be bound by theory, it is believed that the cell ghost membrane components are dispersed within lipid components derived from the vesicular structure. The cell ghost membrane components may variously comprise individual phospholipids or glycolipids, integral or peripheral membrane proteins alone or associated with each other, or integral or peripheral membrane proteins alone or associated with each other and in association with phospholipids or glycolipids. For example, when a liposome is fused with a cell ghost some or all of these cell ghost membrane components are dispersed in the lipid bilayers derived from the liposome.

The present invention also provides a method of producing cell ghosts from viable cells comprising a cell membrane, cytosol and nucleus, comprising the steps of:
(a) providing a suspension of viable cells in an osmotically active solution that is hypotonic to the cell;
(b) gently agitating the hypotonic cell suspension for a period of time so that osmotic pressure renders the membrane permeable and contents of the cytosol and nucleus leak from the viable cells, thereby creating at least partially depleted cells;
(c) separating cellular debris including contents of the cytosol and nucleus from the at least partially depleted cells;
(d) repeating (b) and (c) if necessary until the at least partially depleted cells are depleted of contents of the cytosol and nucleus;
(e) suspending the depleted cells in an isotonic medium for a period of time to allow resealing of the cell membrane to produce cell ghosts;
(f) isolating cell ghosts.

In an embodiment osmotically active solutions suitable for incubating cells of interests are selected from the group consisting of phosphate buffered saline (PBS), 4-(2-hydroxyethyl)-1-piperazineethanesulfonic acid (HEPES) buffer, tris(hydroxymethyl)aminomethane (TRIS) buffer. In an embodiment they are rendered hypotonic by addition of distilled water. By way of example, PBS could be rendered hypotonic by mixing with distilled water to ratios of 1:2, 1:4, 1:10 and 1:0, corresponding to 0.5×PBS, 0.25×PBS, 0.1×PBS and 1×PBS respectively.

In an embodiment viable cells are immersed in an osmotically active solution that is hypotonic to the cell and centrifuged then resuspended to provide viable cells in suspension.

In an embodiment the osmotically active solution further comprises a cell protection agent that modifies the viscosity of the external environment of cells to protect against disintegration of the cell membrane. In an embodiment the cell protection agent is a sugar, protein or polymer that is osmotically active. In particular sugars such as sucrose, fructose, lactose, or galactose, polymers such as polyethylene glycol or its derivatives, Ficoll Solution or albumin may be used. However, sucrose is preferably used. The range of sucrose concentrations may be from 0.01% w/v to 0.1% w/v, with the optimum concentration at 0.06% w/v.

In an embodiment cells are immersed in buffer, typically 0.06% w/v sucrose solution diluted with PBS buffer, typically 0.25×PBS at room temperature.

In an embodiment the cells are kept on a shaker for from 12 to 48, typically 24 hours. Subsequently, the cells are centrifuged to pellet the cells down. The supernatant, consisting of sucrose, debris material and intracellular contents are removed.

In an embodiment the cells are then immersed in buffer, typically 0.06% w/v sucrose solution diluted with PBS buffer, typically 0.1×PBS at room temperature. The cells are kept on a shaker for from 30 minutes to 4 hours, typically 1 hour.

Subsequently, the cells are centrifuged to pellet the cells down. The supernatant, consisting of sucrose, debris material and intracellular contents are removed.

In an embodiment the cells are then immersed in buffer, typically 0.06% w/v sucrose solution diluted with PBS buffer, typically 0.25×PBS at room temperature. The cells are kept on a shaker for from 12 to 48, typically 24 hours.

Subsequently, the cells are centrifuged to pellet the cells down. The supernatant, consisting of sucrose, debris material and intracellular contents are removed.

The cells are then immersed in buffer, typically 0.06% w/v sucrose solution diluted with 1×PBS at room temperature The cells are kept on a shaker for from 1 to 8 hours, typically 4 hours before finally storing at 4° C. prior to use. The final products are termed cell ghosts.

The indicative yield of cell ghosts produced by the abovementioned method lies between 40% and 50%.

Throughout this specification and the claims, the words "comprise", "comprises" and "comprising" are used in a non-exclusive sense, except where the context requires otherwise. When used in this way it will be appreciated that they nevertheless encompass use in the exclusive sense usually denoted by the terms "consisting of" or "consisting essentially of" and therefore the latter terms may be substituted for the former.

EXAMPLES

Materials and Methods

Materials 1,2-dioleoyl-3-trimethylammonium-propane (DOTAP), 1-oleoyl-2-[6-[(7-nitro-2-1,3-benzo-xadiazol-4-yl)amino] hexanoyl]-3-trimethylammonium propane (NBD-DOTAP)

and 1,2-dioleoyl-sn-glycero-3-phosphoethanolamine-N-(lissamine rhodamine B sulfonyl) (Liss Rhodamine) were purchased from Avanti Polar Lipids and kept at −20° C. Trypan blue stain solution and BCA protein assay were purchased from Thermo Fisher Scientific. 8 µm membrane filters were purchased from Merck Millipore and used as supplied. Cyanine 5.5 monoester dyes were purchased from Kerafast and used as per manufacturer's recommendations.

Cell Culture

3T3-L1, a fibroblast-like mouse preadipocyte cell, was cultured in Dulbecco's High Glucose Modified Eagles Medium/high glucose (DMEM/high glucose, HyClone™, GE) containing 10% v/v fetal bovine serum (FBS, HyClone™, GE) and 1% v/v MEM non-essential amino acid solution (NEAA, Life Technologies). HEK293 (human embryonic kidney cell), RAW264.7 (mouse macrophage), HaCaT (human keratinocyte) and HDF (human dermal fibroblast) were cultured in DMEM/high glucose supplemented with 10% FBS. U937 (oncogenic human monocyte) was cultured RPMI-1640 (HyClone™' GE) supplemented with 10% FBS. All cells were maintained in a humidified incubator at 5% $CO_2$ and kept at 37° C.

Example 1

Cell Ghost Production

A schematic illustration of the cell ghost production is shown in FIG. 1A. U937 cells 10, human monocytes, were used as a model for cell ghost production. The U397 cells 10 were subjected to overnight shaking in 0.06% w/v sucrose sequentially in 0.25×, 0.1× and 0.25×PBS in step 20 to form U937 cells with "leaky" membranes 30. Next, in step 40 the U937 cells with "leaky" membranes 30 were shaken overnight in 0.06% w/v sucrose in 1×PBS to form resealed U937 cell ghosts 50. The cell ghost production is described in detail below.

Between $1 \times 10^7$ and $2 \times 10^7$ U937 monocytes were immersed in 2 ml of 0.06% w/v sucrose solution diluted with 0.25×PBS at room temperature in a 12 well plate on a tabletop shaker. Protease inhibitor cocktails, purchased commercially, were added in a ratio of 10 µl to 2 ml of the cell suspension. The cells are kept on a shaker for 24 hours.

Subsequently, the cells were centrifuged at 6000 G for 10 minutes at 4° C. to pellet the cells down. The supernatant, consisting of sucrose, debris material and intracellular contents was removed. The cells were then immersed in 2 ml of 0.06% w/v sucrose solution diluted with 0.1×PBS at room temperature in a 12 well plate on a tabletop shaker. Protease inhibitor cocktails, purchased commercially, were added in a ratio of 20 µl to 2 ml of the cell suspension. The cells are kept on a shaker for 1 hour.

Subsequently, the cells were centrifuged at 6000 G for 10 minutes at 4° C. to pellet the cells down. The supernatant, consisting of sucrose, debris material and intracellular contents was removed. The cells were then immersed in 2 ml of 0.06% w/v sucrose solution diluted with 0.25×PBS at room temperature in a 12 well plate on a tabletop shaker. Protease inhibitor cocktails, purchased commercially, were added in a ratio of 10 µl to 2 ml. The cells were kept on a shaker for 24 hours.

Subsequently, the cells were centrifuged at 6000 G for 10 minutes at 4° C. to pellet the cells down. The supernatant, consisting of sucrose, debris material and intracellular contents was removed. The cells were then immersed in 2 ml of 0.06% w/v sucrose solution diluted with 1×PBS at room temperature in a 12 well plate on a tabletop shaker. Protease inhibitor cocktails, purchased commercially, were added in a ratio of 10 µl to 2 ml of the cell suspension. The cells were kept on a shaker for 4 hours before finally storing at 4° C. prior to use. Cell ghosts were isolated in a yield between 40% and 50%.

The cell ghosts were kept in 0.06% w/v sucrose 1×PBS at 4° C. until required for further use.

The hypotonic solution provided the osmotic pressure required to expand and create transient openings in the cell membranes in order to empty the cellular contents (FIG. 1A), while immersing in the 0.06% w/v sucrose solution results in sufficient viscosity to impede cell rupture.

Example 2

Cell Ghost Emptying

The cell emptying process was elucidated by incorporating the CellTracker™ Green CMFDA dye within the cells before cell ghost production. The dye is converted to a membrane impermeable form once it passes through cell membranes, and is used as an indicator to demonstrate the emptying of the cellular contents in the cell ghost's production process.

$1 \times 10^7$ U937 cells were stained with CellTracker™ Green CMFDA dye as per manufacturer's recommendations. The stained cells were used in the preparation of cell ghosts. U937 cells were cultured till 70% confluency and the cells were centrifuged at 500 G×10 minutes, washed once with Phosphate Buffered Saline (PBS) and suspended in 0.06% w/v sucrose in 0.25×PBS on a shaker overnight at room temperature. The suspension was supplemented with 1% v/v penicillin streptomycin antibiotics and 0.5% v/v Protease Inhibitor cocktail. The cell suspension was subsequently centrifuged at 6000 G×10 minutes and suspended in 0.06% w/v sucrose in 1×PBS on a shaker overnight at room temperature. As a comparator, stained cells were centrifuged at 6000 G×10 minutes and suspended in 0.06% w/v sucrose 1×PBS directly, omitting the step involving incubation in 0.06% sucrose w/v 0.25×PBS. All samples were imaged by Nikon Fluorescence Microscope and fluorescence intensity quantified by a microplate reader.

The fluorescence intensity of each group of cells after the process is completed can be seen in the photomicrographs presented in FIG. 1B and is quantified in FIG. 1C. It is apparent from the data that significant fluorescence remains when cells are shaken in 0.06% w/v sucrose in 1×PBS solution, but that fluorescence is minimal when cells are shaken in 0.06% w/v sucrose in 0.25×PBS solution. This shows clearly the emptying of cellular contents when the cells shaken in a 0.06% w/v sucrose in 0.25×PBS solution. As the cells were cultured in 1×PBS solution, some of the cells may have become non-viable. This is because PBS is not an optimum environment for cell culture, and therefore a slight reduction in fluorescence is observed, as non-viable cells tend to exhibit increase cell membrane leakiness. All samples were imaged by Nikon Fluorescence Microscope and fluorescence intensity quantified by a microplate reader.

Three cell ghost types, 3T3-L1, U937 and Jurkat ghost cells, were exposed to different treatment regimens to remove nuclei and the percentage yield and nuclei removal is shown in FIG. 2. A 50% yield and 99% nuclei removal was achieved when sequential PBS steps of 0.25×(24 h); 0.1×(1 h); 0.25×(24 h) and 1×(24 h) were used on U937 cell ghosts.

Cell Ghost Viability Studies

Cell ghosts were stained with trypan blue and their viability compared against U937 cells over a period of 5 days. Cell ghosts were prepared as above in this Example and added to 10 ml of RPMI-1640 culture media supplemented with 10% FBS. For comparison, an equal number of U937 cells were cultured in the same manner. The samples were counted for total cell count by staining with trypan blue solution on days 1, 2, 3 and 5. The retention of trypan blue stain suggests that cell ghosts are incapable of pumping out the trypan blue stain and so are no longer viable, (FIG. 1D). Furthermore, the total count of cell ghosts in culture medium did not increase over a period of 5 days, whereas the U937 cells in comparison exhibited the usual growth rate.

Example 3

Preparation of mCVTs (Freeze Thaw Cycles)

A schematic illustration of mCVT production is shown in FIG. 4. Biomolecular composites were produced by addition of $1 \times 10^7$ cell ghosts to 10 mg of 1,2-dioleoyl-3-trimethyl-ammonium-propane (DOTAP) lipids to form cell ghosts encapsulated in giant multilamellar liposomes 60. The DOTAP was first weighed, dissolved in 1 ml of chloroform and subsequently dried to create a thin film in an Eppendorf tube under vacuum using a rotatory evaporator. $1 \times 10^7$ cell ghosts were added to the thin film and sonicated in a bath for 1 hour and the mixture was freeze thawed by cycling between liquid nitrogen and room temperature respectively for up to 5 cycles in process 70. The resultant fused biomolecules 80 are characterised as mCVTs and their physical characteristics are shown in FIG. 3 and schematically in FIG. 4. As a result of fusion between the DOTAP film and cell ghosts, mCVTs become progressively larger with each freeze thaw cycle. For example, after 1 cycle the mCVTs had an average hydrodynamic diameter of about 1 µm whereas after 5 cycles the average diameter was about 4 µm.

Example 4

Preparation of mCVTs (Extrusion)

Figure 5A:
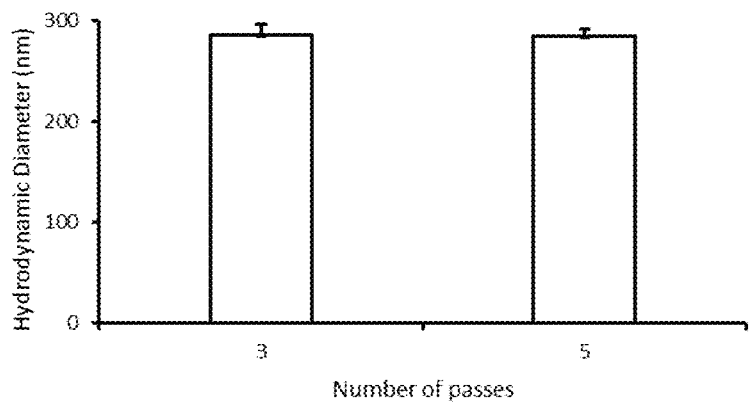
FIG. 5 shows the physical characterization of mCVTs prepared from extrusion, using a handheld extruder. (A) hydrodynamic diameter and (B) zeta potential, after 3 or 5 passes.
Figure 5B:
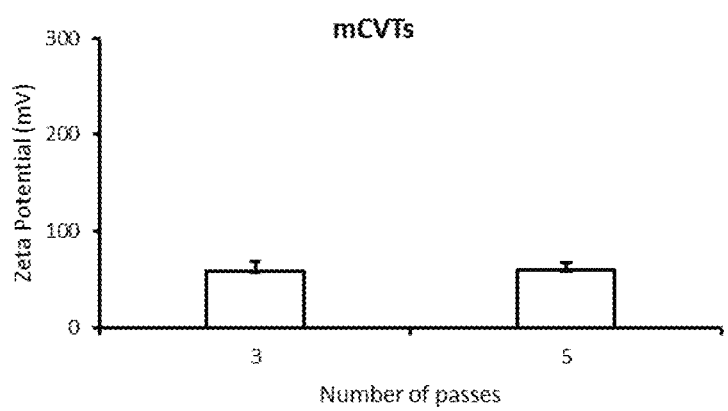
Figure 6:
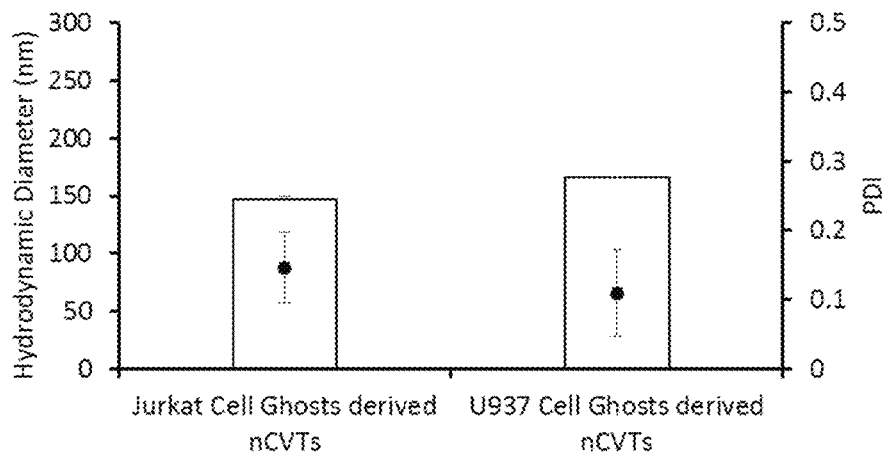
FIG. 6 shows the physical characterization of nCVTs prepared from extrusion, using an extruder. The nCVTs were prepared from Cell Ghosts derived from 2 cell lines, namely Jurkat cells and U937 cells.

Biomolecular composites were produced by addition of $1 \times 10^7$ cell ghosts to 10 mg of 1,2-dioleoyl-3-trimethylammonium-propane (DOTAP) lipids. The required DOTAP was first weighed, dissolved in 1 ml of chloroform and subsequently dried to create a thin film in an Eppendorf tube under vacuum using a rotatory evaporator. $1 \times 10^7$ cell ghosts were then added to the thin film, and sonicated in a bath for 1 hour. Subsequently, the mixture is passed through an extruder consisting of membranes with a pore size of 5 µm 5 times. Size measurements were performed by a Malvern Zetasizer™ ZS. The resultant fused biomolecules are characterised as mCVTs. The physical characterization of mCVTs prepared from extrusion, using a handheld extruder after 3 and 5 passes is shown in FIG. 5.

Example 5

Preparation of nCVTs (Extrusion)

Biomolecular composites were produced by addition of $1 \times 10^7$ cell ghosts to 2 mg of lipids consisting of 1,2-dioleoyl-sn-glycero-3-phosphocholine (DOPC) and cholesterol in a molar ratio of 95:5. The lipids was first weighed, dissolved in 1 ml of chloroform and subsequently dried to create a thin film in a 5 ml round bottom flask under vacuum using a rotatory evaporator. Cell Ghosts prepared from Jurkat cells or U937 cells were used in this example. $1 \times 10^7$/ml cell ghosts were added to the thin film, and sonicated in a bath sonicated for 1 hour. Subsequently, the mixture was passed through an extruder consisting of membranes with a pore size of 8 µm 5 times. The mixture was then passed through an extruder consisting of membrane pore size of 5 µm 5 times. The mixture was then passed through an extruder consisting of membrane pore size of 0.2 µm 5 times. The mixture was then passed through an extruder consisting of membrane pore size of 0.1 µm 5 times. The resultant fused biomolecules are characterised as nCVTs. The size data are shown in FIG. 7.

Example 6

Preparation of nCVTs (Spin Cups)

Figure 7A:
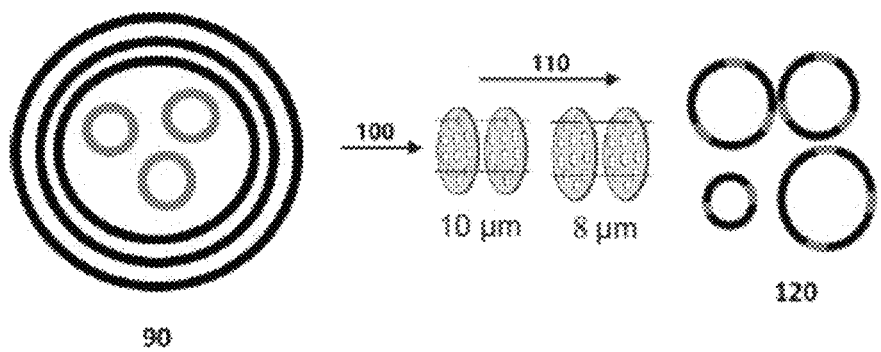
FIG. 7 shows (A) Schematic depiction of nCVT production, involving fusion of cell ghosts and liposomes made by thin film hydration. (B) Size distribution of nCVTs (in nm). (C) Size distribution of liposomes (in nm). (D) Protein concentration of nCVTs and liposomes before and after passing through the spin cups. For comparison, the lipid formulation without cell ghost components that underwent the same procedure is provided. (E) nCVTs and liposomes were loaded with a model drug, albumin-FITC, by the film hydration method, and demonstrate similar loading efficiencies.

A schematic illustration of the nCVT cell ghost production is shown in FIG. 7A. U397 cell ghosts encapsulated in giant multilamellar liposomes 90 were subjected to sonication for 20 minutes in step 100 and then added to a spin cup, fitted with a 10 µm membrane pore size filter followed by an 8 µm membrane pore size filter in step 110 to undergo cell shearing which results in a fusion of membranes from U937 cell ghosts and liposomes, forming nCVTs 120. The preparation of nCVTs with spin cups is described in detail below.

Figure 7B:
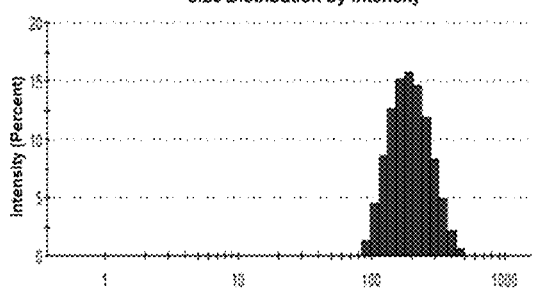

Biomolecular composites were produced by addition of $1 \times 10^7$ cell ghosts to 10 mg of lipids consisting of 1.95 mg of 1, 2-dipalmitoyl-sn-glycero-3-phosphocholine (DPPC) and 0.05 mg of Cholesterol (Chol). The lipids were dissolved in 1 ml of chloroform and evaporated to form a lipid thin film. The required lipids was first weighed, dissolved in 1 ml of chloroform and subsequently dried to create a thin film in an Eppendorf tube under vacuum using a rotatory evaporator. $1 \times 10^7$/ml cell ghosts were added to the thin film, and sonicated in a bath for 20 minutes. Subsequently the mixture was added to a spin cup, fitted with a 10 µm membrane pore size filter. The mixture was centrifuged at 14,000 G for 10 minutes at 4° C. The flow through was reintroduced to the spin cup and the abovementioned process is repeated. The mixture was then added to a spin cup with an 8 µm membrane pore size filter. The mixture was centrifuged at 14,000 G for 10 minutes at 4° C. The flow through was reintroduced to the spin cup and the abovementioned process is repeated. The flow through was then added to a size exclusion column, consisting of Sephadex® G50 beads. Fractions containing the purified fraction were collected. Size measurements were performed by a Malvern Zetasizer™ ZS. Size data is shown in FIG. 7B. The fused biomolecules are characterised as nCVTs.

Example 7 nCVTs Production 1.95 mg of 1,2-dipalmitoyl-sn-glycero-3-phosphocholine (DPPC) and 0.05 mg of Cholesterol (Chol) were dissolved in 1 ml of chloroform and evaporated to form a lipid thin film. When fluorescent labelling is required, cyanine 5.5 or cyanine 7 NHS monoester was dissolved in the chloroform layer before evaporating. $1 \times 10^7$ cell ghosts were added to the film and sonicated in a bath sonicator for at least 30 minutes. The resultant suspension was added to a 10 µm filter spin cup and centrifuged at 15,000 G×10 minutes twice, before adding to an 8 µm filter spin cup and centrifuging at 15,000 G×10 minutes twice. The process is illustrated in FIG. 7A. The fusion of lipids and cell ghosts are characterised as nCVTs.

Example 8 (Comparative Example)

Liposome Production

Liposomes of the same lipid formulation as Example 7 were produced for comparison.

Figure 7C:
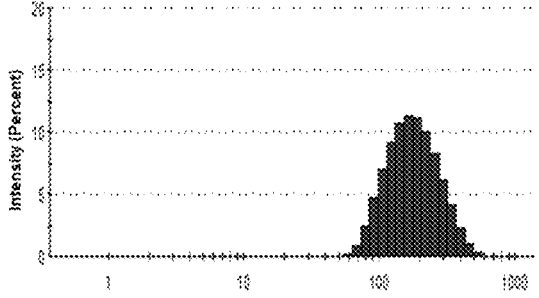

Liposomes were prepared with 1.95 mg of DPPC and 0.05 mg of Cholesterol for loading and in vitro experiments. The liposomes were extruded using a 200 nm LipX extruder 11 times. For in vivo experiments, PEGylated liposomes consisting of 2.61 mg of DPPC, 1.61 mg of DSPE-PEG2000 and 0.78 mg of cholesterol were used and extruded 11 times using a 200 nm LipX extruder. Size data is shown in FIG. 7C.

Example 9

Size Distribution and Protein Concentration of nCVTs and Liposomes

Figure 7D:
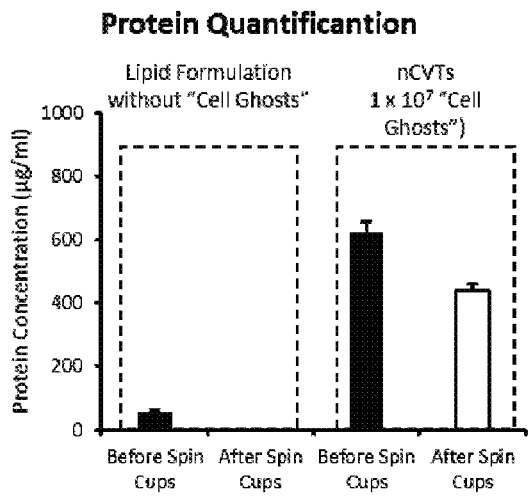

The size (hydrodynamic diameter) of nCVTs of Example 7 and liposomes prepared in Example 8 for in vitro experiments were determined by Dynamic Light Scattering (DLS) using a Malvern Zetasizer™ Nanoseries. Protein quantification was assayed by a standard BCA protein kit. Cyanine 5.5 quantification was assayed by a microplate reader at $E_x/E_m$ of 673/700 nm. The size distribution of nCVTs (FIG. 7B) was comparable to that of liposomes (FIG. 7C) and both showed an average size of about 180 nm. A standard protein BCA kit was used to quantify the nCVTs. Protein concentration was assayed before and after passing through the spin cups and the average protein concentration quantified from nCVTs was about 400 µg/ml with minimal loss in the process (FIG. 7D).

Example 10

Proof-of-Fusion Assay

Lipids conjugated with the fluorophores NBD and rhodamine were added to the lipid component of liposomes and nCVTs in order to demonstrate the fusion of liposomes with cell ghosts. In principle, the excitation of the NBD fluorophore at 460 nm results in an emission at 535 nm. This in turn, excites the rhodamine fluorophore at 560 nm, resulting in an emission at 585 nm. The closer the two fluorophores, the greater the emission observed at 585 nm.

Liposomes and nCVTs were prepared as described in Example 8 for in vitro experiments and Example 7, respectively, with the addition of 1 mol % of NBD and rhodamine lipids. To check the dose effect of the fluorophores, 2 mg and 5 mg of total lipids were used in the production of liposomes and nCVTs, respectively. The liposomes and nCVTs samples were then assayed at 460 nm and the emission spectrum from 300 nm to 700 nm was recorded using a microplate reader.

Figure 8A:
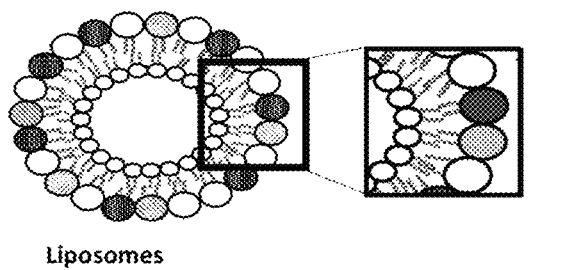
FIG. 8 is a schematic representation of fluorophores (Rhodamine and NBD) positioning in (A) Liposomes and (B) nCVTs. Fluorophores are positioned close to each other in liposomes, but the fusion of cell ghosts and lipids results in the insertion of cell ghost membrane components between the lipids making up the lipid membranes, increasing the distance between the fluorophores. (C) FRET analysis of Rhodamine and NBD fluorophores (1 mol %) when 2 mg of lipids were used. (D) FRET analysis of Rhodamine and NBD fluorophores (1 mol %) when 5 mg of lipids were used.
Figure 8B:
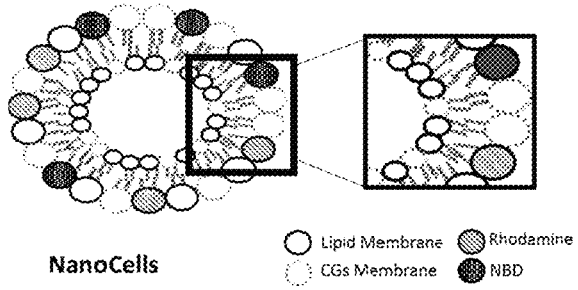
Figure 8C:
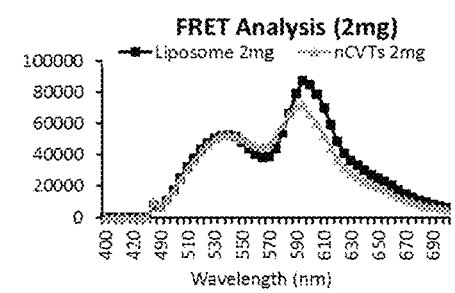
Figure 8D:
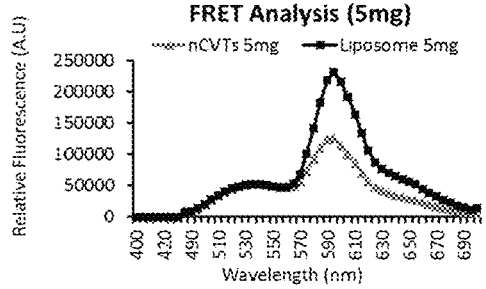

In the case of liposomes, the fluorophores are located in close proximity to each other (FIG. 8A). When cell ghosts are fused with the lipids, the cell ghosts membrane inserts between the fluorophores, increasing the distance between them (FIG. 8B). As a result there is a reduction of the emission observed at 585 nm. Liposomes show a higher emission when 2 mg of lipids is used in both liposomes and nCVTs (FIG. 8C). When 5 mg of lipids was used in the formulation instead a greater difference in the fluorescence readings was observed. The emission at 585 nm was observed to be considerably higher in liposomes than nCVTs. The fact that the emission fluorescence readings are lower in nCVTs than liposomes suggests that the cell ghost component has inserted between the fluorophores (FIG. 8D), which in turn demonstrates that fusion between the cell ghosts and lipids has taken place.

Example 11

Albumin-FITC Loading

A model drug, albumin-FITC, loaded into the nCVTs. Albumin-FITC is a large protein molecule that could be used as a surrogate for small molecules or peptides. The conjugation of FITC aids in the quantification of loading efficiency.

Albumin-FITC loaded nCVTs were prepared as described in Example 7, with the exception that cell ghosts were centrifuged at 6000 G×10 minutes and suspended in 1 mg/ml of albumin-FITC before adding to the prepared lipid film. For comparison, albumin-FITC loaded liposomes were prepared in the same manner but without addition of cell ghosts. Both samples were dialyzed against 1 litre of PBS at 4° C. with one change of dialysis fluid to maintain sink conditions in order to remove non-encapsulated albumin-FITC. Albumin-FITC loading percentage was quantified by measuring the $E_x/E_m$ at 490/525 nm against a known standard.

Figure 7E:
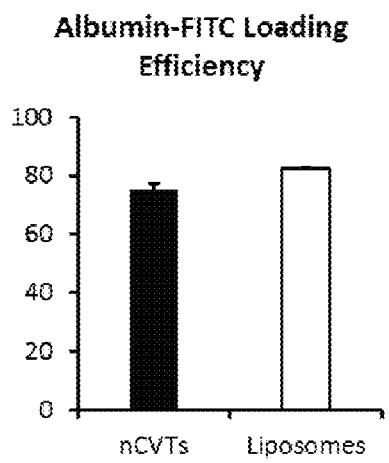

It was found that the loading efficiency of nCVTs was similar to that of liposomes when loaded by this method (FIG. 7E). The film hydration method is both simple and uncomplicated, and can be adapted for the different drug moieties that could be loaded to nCVTs (Akbarzadeh et al, 2013).

Example 12

In Vitro Cellular Uptake

Figure 9:
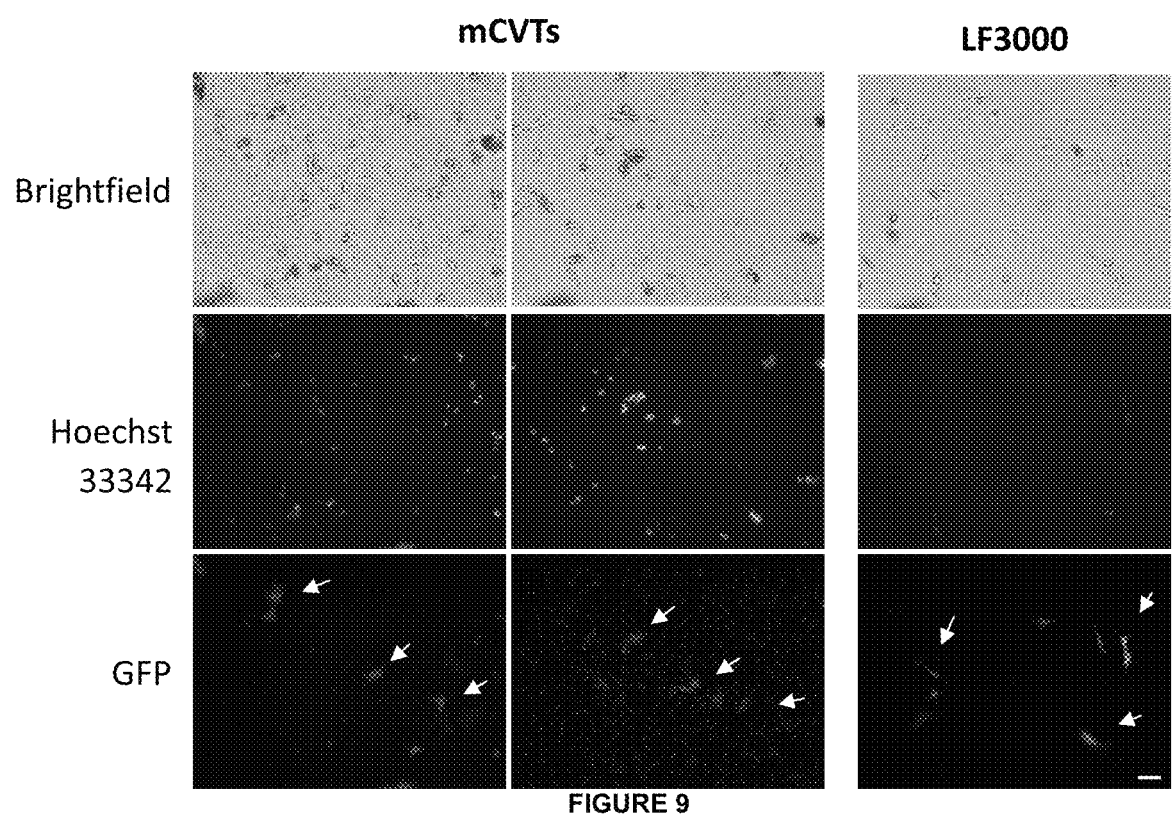

The cellular uptake profile of mCVTs was compared to that of an industry reagent, Lipofectamine® 3000 (LF3000). Transfection was carried out by adding 5 µg of plasmid encoding for Green Fluorescent Protein (GFP) to U937 cell ghost-derived mCVTs and LF3000. The mixture was allowed to stand for 10 minutes before addition to 3T3-L1 cells, a Hard-To-Transfect cell, for 48 hours transfection. Brightfield and Hoechst 33342, which stains live cells, images showed considerably higher live and healthy cells by mCVTs than LF3000 (FIG. 9). The degree of transfection (GFP) appears to be similar.

The cellular uptake profile of nCVTs was compared to that of liposomes. Two cancer cell lines, HeLa and CT26, were investigated with the former being a commonly investigated cancer cell line model and the latter to be used in a CT26 mouse colon carcinoma model, with tumour formation subcutaneously on the back of the mouse.

nCVTs and liposomes labelled with cyanine 5.5 NHS monoester were prepared as described as in Examples 7 and 8 for in vitro experiments. The samples were normalized for their fluorescence levels and added at a low dose (1× normalized fluorescence levels) and high dose (5× normalized fluorescence levels) to 2×10⁵ HeLa and CT26 cells respectively and incubated at 37° C. for 2 hours. The samples were then washed with PBS three times and trypsinized before being assayed by FACS using BD LSR Fortessa™ Flow Cytometry Analyser.

Confocal microscopy images showed a clear uptake of both Cyanine 5.5 labelled liposomes and nCVTs after 2 hours incubation, as shown by the green fluorescence within the plasma membranes demarcated by the CellMask™ Orange dye (FIG. 10A-B). A closer examination suggested that the uptake was greater for nCVTs than liposomes for both cell lines. This empirical observation was corroborated by use of Flow Activated Cell Sorting (FACS), showing a greater right shift, indicating a greater cellular uptake for nCVTs than liposomes (FIG. 10C-D). The cellular uptake was also increased when a higher concentration (demarcated by the green lines) of nCVTs and liposomes were used, further demonstrating a dose effect.

The U937 monocyte cell line was selected for use in nCVTs due to the intrinsic targeting properties of monocytes towards inflammation sites. We hypothesised that the membrane proteins of the originator U937 cells were retained in the production of nCVTs. Consequently we hypothesised that the nCVTs would be recognized and taken up by the target cell. The enhanced cellular uptake of nCVTs is pertinent as it allows therapeutic dose reduction as well as reduction in off-target collateral effects, further minimizing the risk of adverse reactions. Hence, nCVTs may be find potential applications in anti-cancer strategies where a low drug concentration is required to minimize adverse reactions and yet achieve sufficiently high local concentrations at the target site. Due to the nano dimensions of nCVTs, this effect could be two fold, from the synergistic interplay between the EPR effect of nanoparticles as well as the intrinsic targeting properties of nCVTs.

Example 13

In Vivo Co-Localisation of nCVTs

The nCVTs labelled with cyanine 7 NHS Monoester dye (Cy7) of Example 7 were compared with similarly labeled liposomes of the same lipid constitution (Liposomes produced for loading and in vitro testing were prepared with 1.95 mg of DPPC and 0.05 mg of Cholesterol. Liposomes produced for in vivo experiments were PEGylated, and prepared with 2.61 mg of DPPC, 1.61 mg of DSPE-PEG2000 and 0.78 mg of cholesterol.) The samples were then injected through the tail vein of a CT26 mouse colon carcinoma model, with tumour formation subcutaneously on the back of the mouse.

Three groups of mice were injected with Cy7 labelled nCVTs, Cy7 labelled liposomes and free dye. After 24 hours, the mice were imaged using the In Vivo Imaging Systems (IVIS) spectrum. A clear accumulation of the fluorescence labelled nanoparticles at the tumour site is observed for nCVTs and liposomes, but not when free dye was used (FIG. 11A). As the free Cy7 dye is water soluble, it is rapidly cleared and does not accumulate in the tumours.

The tumours were subsequently excised and imaged separately to quantify the fluorescence intensity from each group (FIG. 11B). The relative fluorescence intensity at the tumours for both nCVTs and liposomes were significantly higher than for free dye. In comparison, the relative fluorescence intensity was similar for both nCVTs and liposomes. As the liposomes used were PEGylated and long circulating, the results suggest that nCVTs were similarly long circulating in an in vivo system, despite not being PEGylated. A plausible hypothesis for this phenomenon is that the protein markers associated with the cell ghosts used in the production of nCVTs act to delay recognition by the immune system and subsequent elimination in the same manner as PEGylation. In addition, the prolonged in vivo circulation time of nCVTs, which are comparable to PEGylated liposomes, suggests that a reduced dosing frequency is required and thus further contributing to the dose sparing effect.

The relative fluorescence intensity for the excised organs for each of the groups were examined (FIG. 11C). The free dye group showed a reduced fluorescence intensity for organs responsible for clearance, namely the liver and kidney. This suggests that the free dye has already been largely eliminated from the mouse within 24 hours. In comparison, the nCVTs and liposomes groups showed elevated fluorescence intensities in the liver and kidneys, with nCVTs showing a greater accumulation in the liver than liposomes. On the other hand, a higher fluorescence intensity was observed in the kidneys for liposomes than nCVTs. A plausible hypothesis is that the nanoparticles may be metabolized at the liver into more water soluble products, but at different rates as a result of the presence of the cell ghosts components in the nCVTs.

Example 14

Cell Ghosts (CGs) Production

Figure 12A:
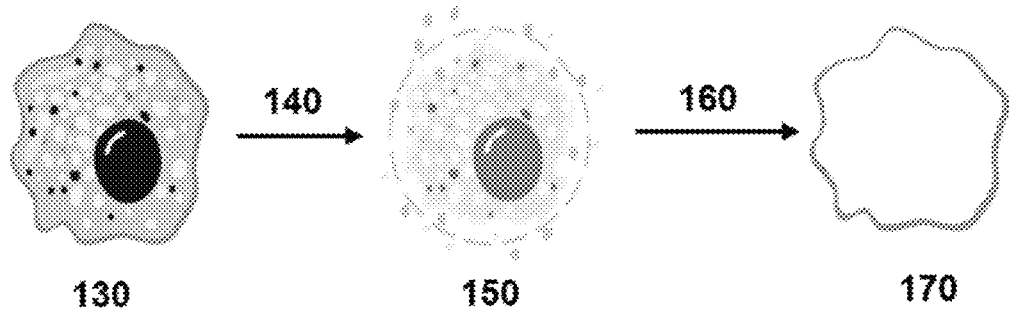
FIG. 12 shows (A) Cell Ghost production schematic. (B) Viability studies of 3T3-L1 CGs vis-à-vis cells in culture medium over 5 days.

Cell ghosts were produced via changing osmotic pressure using neutral phosphate buffer saline (PBS, pH 7.4) with 0.1% w/v sucrose (PBS/sucrose). Cells were harvested and incubated in 0.25×PBS/sucrose at room temperature for 1 day on a shaker, followed by incubating cell ghosts in 0.1×PBS/sucrose for various days. In order to prevent cell rupture due to changes in osmotic pressure, the hypotonic buffer is mixed with a viscous reagent, which provides the viscosity to retard excessive cell expansion. Cell ghosts were harvested in 1×PBS/sucrose and stored at 4° C. for further experiments. This process is illustrated in FIG. 12A using 3T3-L1 cells as an example. In brief, 3T3-L1 cells 130 were harvested and incubated in hypotonic buffer 140, resulting in a step 150 wherein transient pores on cell membrane. The cells re then incubated in isotonic solution 160 to form cell ghosts 170.

Protease inhibitor cocktail (Abcam) was used with the manufacturer's instruction throughout the experiment. The presence of nucleus was checked by Hoechst 33342 staining. Remaining DNA in cell ghosts were isolated and checked by DNA gel electrophoresis.

Example 15

Cell Ghosts Non-Viability Studies

Equal number of 3T3-L1 cells and cell ghosts, prepared based on Example 14, were prepared in DMEM/high glucose complete culture medium. The samples were collected and counted for total cell or cell ghost count by staining with trypan blue solution on days 1, 2, 3, 4 and 5.

Figure 12B:
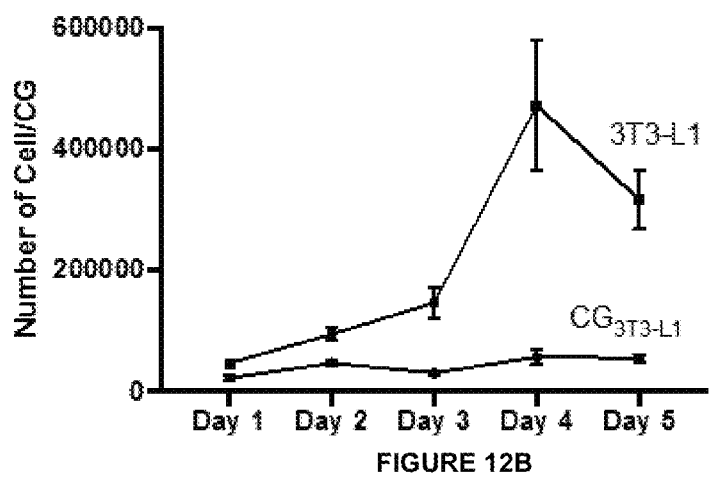

Cell ghosts tested were found to be no longer viable, and do not result in cell growth after treatment. Cell ghosts were compared to live 3T3-L1 cells over a 5 day period and the cell numbers were plotted (FIG. 12B). It is important to ensure that the cell ghosts are no longer viable before use so as to prevent any cellular contamination from viable cells.

Example 16

Cell Ghosts Emptying

Figure 13A:
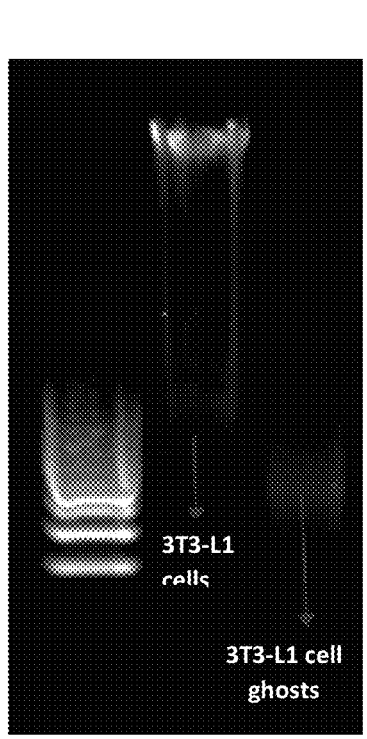
FIG. 13 shows (A) DNA gel electrophoresis image of 3T3-L1 Cells and associated Cell Ghosts. Left to Right: 100 Bp DNA ladder, 3T3-L1 cells and 3T3-L1 CGs. (B) Hoechst 33342 staining of 3T3-L1 cells and CGs. Scale bar indicates 100 $\mu$m. (C) Quantification of DNA concentrations of CGs from 3T3-L1 and U937 via NanoDrop.
Figure 13B:
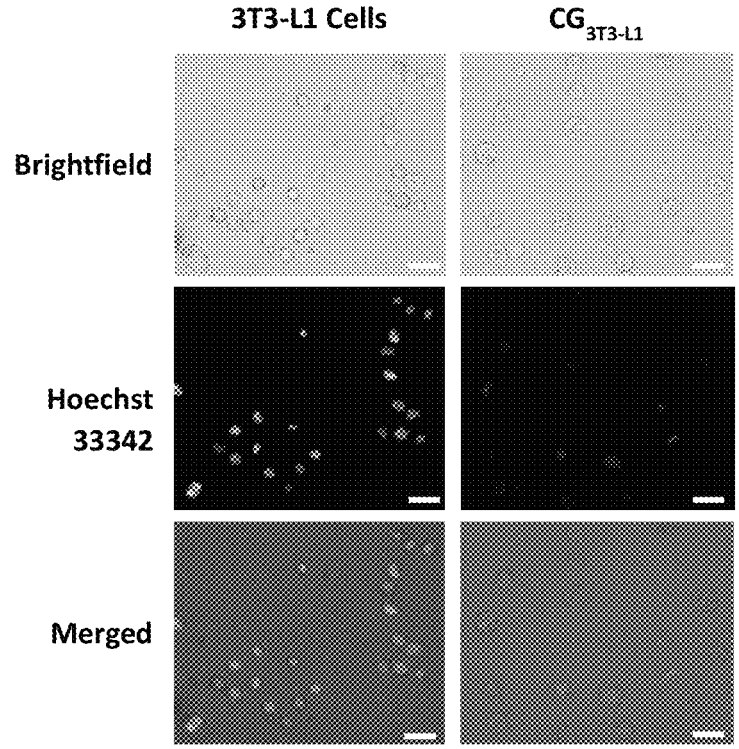

3T3-L1 cell ghosts prepared based on Example 14 were demonstrated to have undergone intracellular emptying via 3 experiments:
1) Cells & cell ghosts were ruptured and passed through DNA gel electrophoresis. Results are shown in FIG. 13A.
2) Hoechst 33342, a dsDNA stain, was applied to both cells & cell ghosts and visualized under fluorescence microscopy. Results are shown in FIG. 13B.
3) Cell & 3T3-L1 cell ghosts were ruptured and DNA concentration was quantified using NanoDrop™. U937 monocytes cell ghosts prepared based on Example 14 and tested. More than 74.9% and 48.5% of DNA was emptied out of 3T3-L1 and U937 cells respectively. Results are shown in FIG. 13C.

As seen from FIGS. 13A-13C, in all 3 experiments, cell ghosts were demonstrated to have undergone substantial cell emptying.

Example 17

Production and Characterization of mCVTs 2.5 mg of DOTAP was weighed and dissolved in 1 ml of chloroform in a 5 ml round bottom flask. A dry thin lipid film was formed on the round bottom flask under vacuum at 35° C. for at least 1 hour. Cell ghosts prepared based on Example 14 were added into the dry lipid film followed by agitation. The mixture was passed through 8 μm membrane filter using liposome extruder (Genizer™). The resultant fused biomolecules are characterised as mCVTs.

DOTAP liposomes were prepared in a similar manner but without addition of cell ghosts. $mCVT_{3T3-L1}$ was transfected with plasmid DNA containing pEZX-MR04 (miRNA overexpression scrambled control clone, GeneCopoeia) using Lipofectamine® 3000 (LF3000, Life Technologies) according to the manufacturer's instruction.

Samples were taken for the measurement of size, poly dispersity index (PDI) and zeta potential. All size and zeta potential measurements were determined at 25° C. by dynamic light scattering on a Zetasizer™ Nano ZS (Malvern, UK). Data were analysed using software supplied with the Zetasizer™ and the results were represented in at least three different measurements per run for more than 10 runs carried per sample. Protein concentration was tested using bicinchoninic acid (BCA) assay for each sample. The sizes of the different mCVTs ($mCVT_{3T3-L1}$, $mCVT_{U937}$, $mCVT_{HEK293}$, $mCVT_{RAW264.7}$) mCVT with plasmid compared with to DOTAP liposomes are shown in FIG. 5A.

Zeta potentials for the different cell lines were also similarly positive due to the presence of cationic DOTAP. For comparison, the size distribution of $mCVT_{3T3-L1}$ & DOTAP liposomes are shown in FIGS. 14A and 14B respectively. Z-average size distribution of $mCVT_{3T3-L1}$ and DOTAP liposomes by intensity are shown in FIGS. 14C and 14D respectively.

Without wishing to be bound by theory, it is believed that the use of 8 μm membrane filters may provide better mCVT reproducibility and less protein aggregation than membrane filters with a smaller pore size at least for certain cell types.

Example 18

Proof-of-Fusion Assay

Liposomes and $mCVT_{3T3-L1}$ were prepared based on Example 17 with the addition of 0.1 mol % NBD-DOTAP and lissamine rhodamine lipid. To demonstrate the incorporation of cell membrane from $CG_{3T3-L1}$ to $mCVT_{3T3-L1}$, $0.5 \times 10^7$, $1 \times 10^7$ and $2 \times 10^7$ of $CG_{3T3-L1}$ were used to produce $mCVT_{3T3-L1}$ while keeping constant the amount of DOTAP lipid. The liposomes and mCVTs were then measured at 460 nm using a microplate reader and the emission spectra from 300 nm to 700 nm were recorded.

Another method used to demonstrate the fusion was by detecting the presence of cell membrane component and DOTAP lipid component in the same vesicle. 0.1 mol % NBD-DOTAP was added to the lipid component during the production of liposome and $mCVT_{3T3-L1}$. Cyanine 5.5 NHS monoester was used for the labelling of CGs for the production of mCVTs. Cell ghosts for $mCVT_{3T3-L1}$ were labelled with Cyanine 5.5 NHS monoester according to the manufacturer's instruction.

The samples ($CG_{3T3-L1}$, DOTAP liposomes & $mCVTs_{3T3-L1}$) were analysed using BD LSR Fortessa™ flow cytometry analyser for Cy 5.5 (Ex/Em: 675 nm/694 nm) & NBD (Ex/Em: 460 nm/535 nm) respectively using single colour (FIG. 15B) and dual colour channels (FIG. 15C). Only the mCVTs demonstrate the presence of a single population of two fluorophores, indicating fusion between cell ghost membranes and lipids.

Proof-of-fusion was also demonstrated using an adaption of the FRET assay as described in Example 10. Liposomes and $mCVT_{3T3-L1}$ were prepared based on Example 17 with the addition of DOTAP lipids conjugated with Lissamine Rhodamine (Ex/Em: 560/583) and NBD (Ex/Em: 465/535). In the subsequent production of DOTAP liposomes, the close proximity of rhodamine and NBD fluorophores results in an increased in fluorescence when excited at 460 nm.

In the event of fusion, the two fluorophores would be pushed apart by the addition of CGs membrane component and a depression of fluorescence intensity is expected. Such depression can be seen in FIG. 16A. This effect is observed to increase when more CGs were used (mCVT 2×), suggesting fusion of lipids and CGs membranes.

In general, increasing the CGs concentration in the mCVTs formulation reduced the hydrodynamic size of the prepared mCVTs (from mCVTs 0.5× to mCVTs 1×), till the optimal hydrodynamic size of about 400 nm was observed. After which the hydrodynamic size of the mCVTs increased, possibly due to excess CGs leading to higher propensity for aggregation (FIG. 16B). On the other hand, zeta potential was in general positive due to the incorporation of cationic DOTAP, but decreased when more $CG_{3T3-L1}$ was used as observed with mCVTs (2×), with the greatest decrease observed when 3T3-L1 cells were used, showing a net negative zeta potential. This suggests that intracellular contents such as proteinaceous material in mCVTs were aggregated with cationic DOTAP lipids, reducing the net zeta potential to net negative (FIG. 16C). This is also supported by the protein concentration in $mCVT_{3T3-L1}$ (1× cells), where shows much higher protein concentration compared to mCVTs produced from CGs (FIG. 16D). Interestingly, $mCVT_{3T3-L1}$ (2×) does not show higher protein concentration compared to $mCVT^{3T3-L1}$ (1×) where a lower concentration of CGs were used, suggesting that the lower protein yield observed from mCVTs (2×) was due to protein aggregation formed during extrusion and thus lost. Indeed, this phenomena corroborate with the trend eluted earlier on the decrease in hydrodynamic size of mCVTs when more CGs were used, after which the hydrodynamic size increases due to possible protein aggregation as a result of excess CGs Example 19

Cellular Uptake of mCVTs

Fluorophore-labelled DOTAP liposome prepared based on Example 18, 3T3-L1 cell ghosts ($CG_{3T3-L1}$) prepared based on Example 14 and $mCVT_{3T3-L1}$ prepared based on Example 17 were produced for the cellular uptake experiment. 0.1 mol % NBD-DOTAP was used for the labelling of lipid component in DOTAP liposome and mCVTs. Cyanine 5.5-labelled $CG_{3T3-L1}$ was used to label the outer membrane layer of CGs, which was incorporated into mCVTs by extrusion. 3T3-L1 cells with 60-70% confluency were treated with fluorophore-labelled DOTAP liposomes, $CG_{3T3-L1}$ and $mCVT_{3T3-L1}$.

Figure 17A:
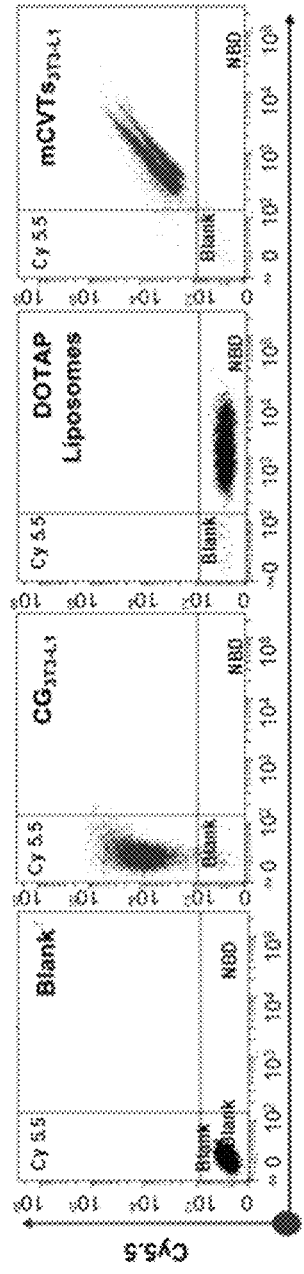
FIG. 17 shows uptake of mCVT$_{3T3-L1}$, DOTAP liposome and CG$_{3T3-L1}$ into 3T3-L1 cells. (A) Dot plots of CG$_{3T3-L1}$, DOTAP liposome and mCVT$_{3T3-L1}$ for flow cytometry analysis. (B) Uptake of DOTAP liposome, CG$_{3T3-L1}$ and mCVT$_{3T3-L1}$ into 3T3-L1 cells. Analysis was done for 1, 3, 6, 24 and 48 h.

As shown in FIG. 17A, the different vesicle populations were analysed via flow cytometry and distinct populations as labelled by the fluorophores were observed, with mCVT$_{3T3-L1}$ demonstrating a fused profile.

Figure 17B:
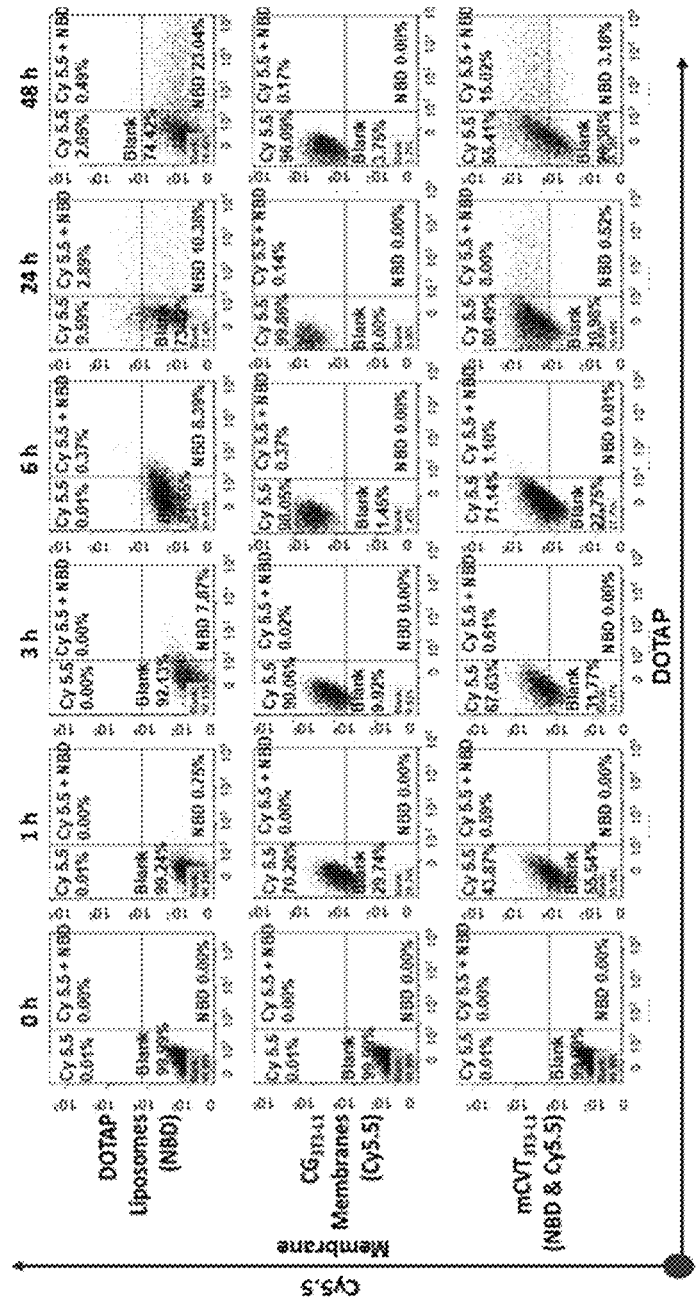

As shown in FIG. 17B, the fluorophore-labelled mCVT$_{3T3-L1}$ were added to 3T3-L1 cells to observe the cellular uptake and subsequent intracellular fate. The 3T3-L1 cells were analysed for 1, 3, 6, 24 and 48 hours via flow cytometry for the respective fluorophores. As the hydrodynamic size of mCVT$_{3T3-L1}$ were larger than 400 nm, the rate of internalization was observed to be slow, showing internalization only after 24 hours. A combination of fluorophore readouts from both Cy5.5 stain from CGs and NBD from the lipid component is taken to mean internalization.

Example 20

Transfection of Cells Using LF3000 and mCVTs

3T3-L1, HEK293, HaCaT and HDF with 60-70% cell confluency were prepared for transfection. The cells were transfected with plasmid DNA containing pEZX-MR04 (miRNA overexpression scrambled control clone, GeneCopoeia) using Lipofectamine® 3000 (LF3000, Life Technologies) according to the manufacturer's instruction. For transfection using mCVTs prepared based on Example 17, the plasmid was incubated with mCVTs at room temperature for 10 min, followed by addition to target cells with serum-free medium. After incubating in serum free medium for 6 hours, mCVTs were removed and the cells were rinsed with PBS and the culture medium was replaced with complete medium. CGs and DOTAP liposomes were used controls. Propidium iodide was added to samples to determine cell viability. The percentage transfection efficiency and cell viability were determined by detecting enhanced green fluorescence protein (GFP, reporter of the plasmid) and propidium iodide, respectively, using BD LSR Fortessa™ flow cytometry analyser. All fluorescence images were taken using Olympus BX51 fluorescence microscope.

mCVT's were tested against Lipofectamine® 3000 (LF3000), a commonly used industry standard transfection reagent, using flow cytometry. Comparison was performed in a dose dependent manner. Recommended dose of LF3000 starts from 3 µl. Transfection was performed on 3T3-L1 preadipocytes, a Hard-To-Transfect cell line, using plasmids encoding for eGFP. Cell culture confluency was at 50-70%.

Figure 18A:
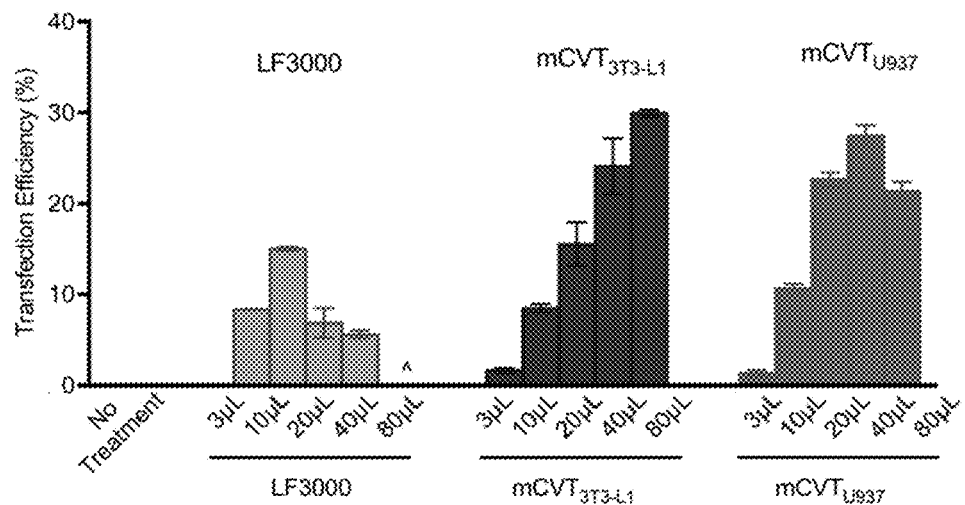
FIG. 18 shows transfection efficiency on 3T3-L1 and cell viability of 3T3-L1 using mCVT$_{3T3-L1}$, compared to Lipofectamine® 3000, analysed using flow cytometry. (A) Transfection efficiency on 3T3-L1 using LF3000, mCVT$_{3T3-L1}$ and mCVT$_{U937}$. No treatment was used as control. ˜80 $\mu$l of LF3000 is too cytotoxic to determine the transfection efficiency. (B) Cell viability of 3T3-L1 using LF3000, mCVT$_{3T3-L1}$ and mCVT$_{U937}$. No treatment was used as control. A the cytotoxicity is too high to determine cell viability. Data represented means±SEM (n=3), *P<0.1, *P<0.001, **P<0.0001 (one-way ANOVA).

As shown in FIG. 18A, transfection efficiency peaked at 15% for LF3000 when 10 µl was used, compared to approximately a maximum of 30% when 80 µl of mCVT$_{3T3-L1}$ or 40 µl of mCVT$_{U937}$ were used, respectively.

Figure 18B:
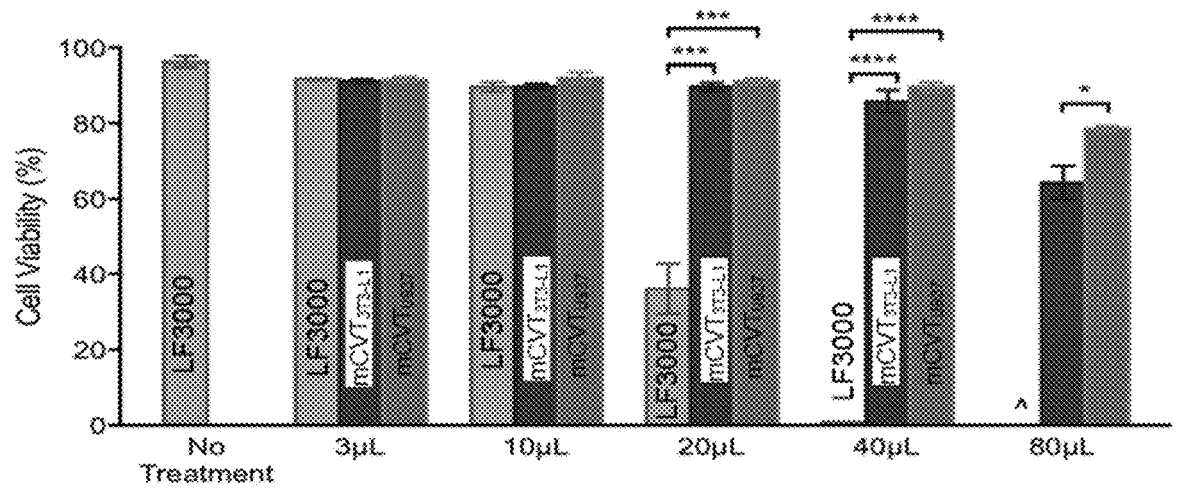
Figure 19:
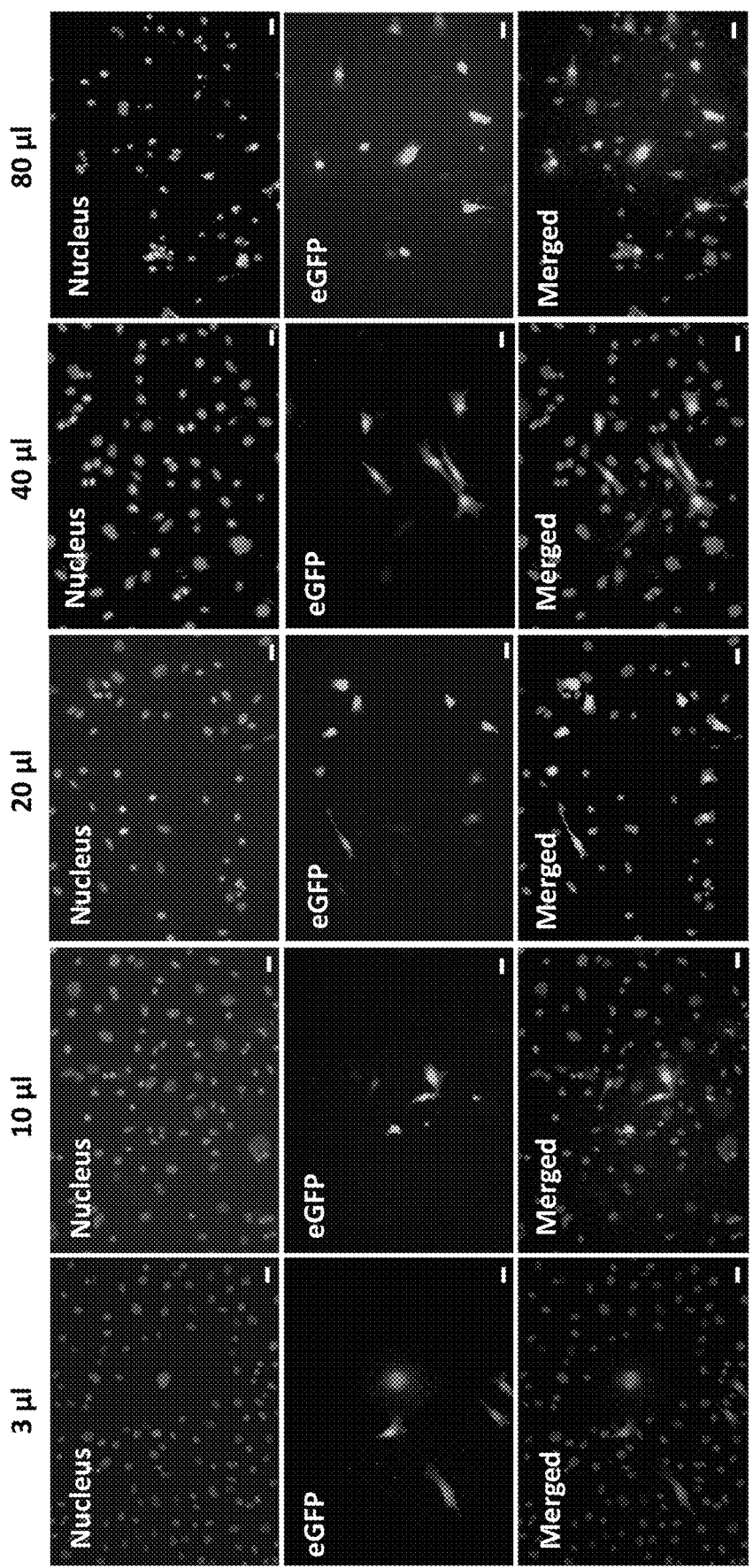
FIG. 19 shows fluorescence microscopy images of transfection using increasing doses of mCVT$_{3T3-L1}$. Successfully transfected cells would express eGFP. Hoechst 33342 was used for nucleus visualization. Scale bars represents 100 $\mu$m.
Figure 20A:
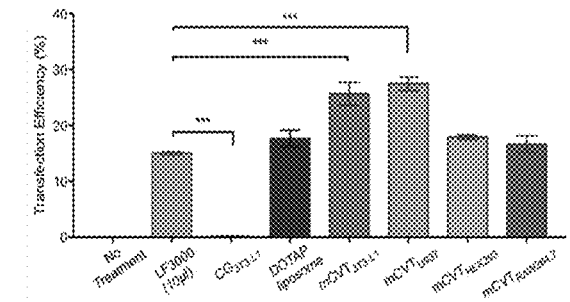
FIG. 20 shows transfection efficiency and cell viability of different mCVTs on mouse embryonic fibroblast, 3T3-L1. 3T3-L1 cells are not cancer originated. (A) Transfection efficiency of LF3000, CG$_{3T3-L1}$, DOTAP liposome and different mCVTs on 3T3-L1. No treatment was used as control. (B) Cell viability of LF3000, CG$_{3T3-L1}$, DOTAP liposome and different mCVTs on 3T3-L1. Data represented means±SEM (n=3), P<0.001. No significant difference were found between mCVT$_{3T3-L1}$ and mCVT$_{U937}$ for both transfection efficiency and cell viability.
Figure 20B:
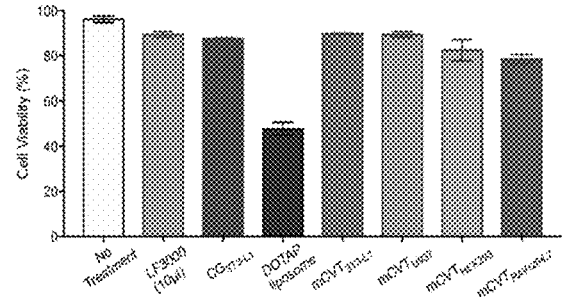
Figure 21A:
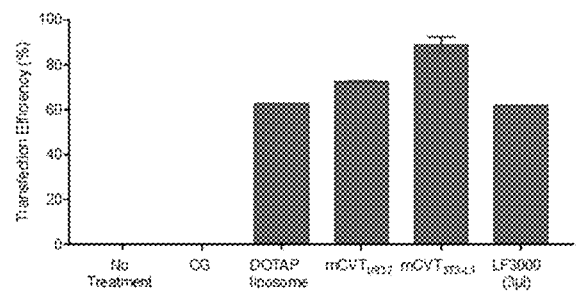
FIG. 21 shows transfection efficiency and cell viability of different mCVTs on human embryonic cells, HEK293 cells. HEK293 cells are epithelial cells and not cancer originated.
Figure 21B:
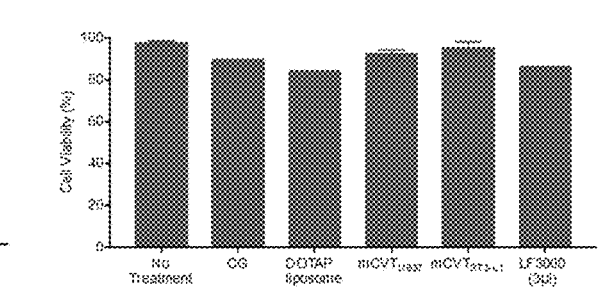
Figure 22A:
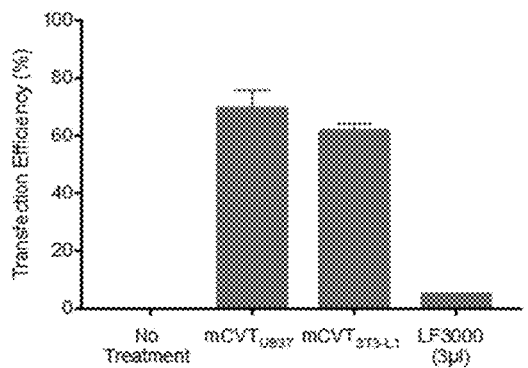
FIG. 22 shows transfection efficiency and cell viability of different mCVTs on human keratinocyte (HaCaT). HaCaT cells are keratinocytes and not cancer originated.
Figure 22B:
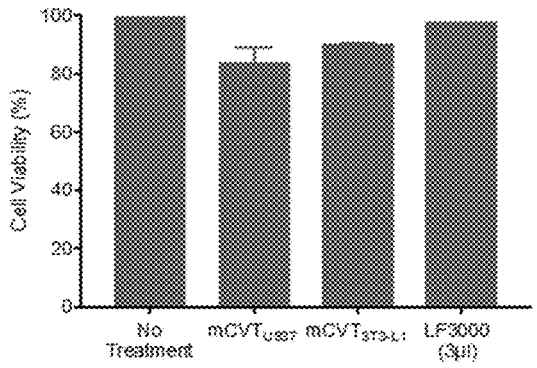
Figure 23A:
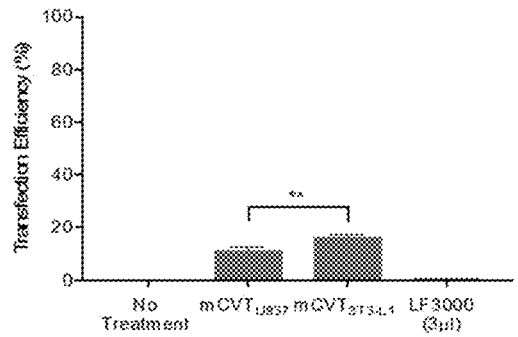
FIG. 23 shows transfection efficiency and cell viability of different mCVTs on human dermal fibroblast (HDF). HDF cells are not cancer originated.
Figure 23B:
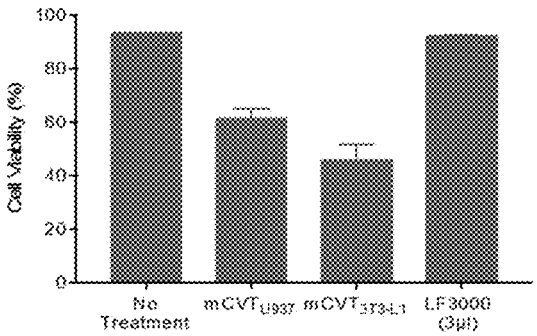

In general, cell viability decreases when transfection reagent concentration increases. Results for the cell viability test is shown in FIG. 18B. However, LF3000 demonstrated a significant reduction in cell viability when 20 µl was used, with almost zero viability at 40 µl. This would account for the low transfection efficiency at these doses. In comparison, both mCVT$_{3T3-L1}$ and mCVT$_{U937}$ demonstrated high cell viabilities, approximately 68% when 80 µl of reagents were used.

Statistical Analysis

All statistical analyses for Examples 1 to 13 were performed using IBM SPSS Version 21. All statistical analyses for Examples 14 to 20 were performed using GraphPad Prism® 7 using one-way ANOVA, followed by Bonferroni post hoc tests, where P<0.05 was deemed significant. Radiant efficiencies of in vivo experiments were compared using one way ANOVA statistical test, using Bonferroni post hoc tests. P values less than 0.05 were considered to be significant.

REFERENCES

References cited herein are listed on the following pages, and are incorporated herein by this reference.

ASC Symposium Series 580, Chapters 6 and 7, Carbohydrate Modifications in Antisense Research, Y. S. Sanghui & P. Dan Cook, eds.

Akbarzadeh A., Rezaei-Sadabady R., Davaran S., Joo S. W., Zarghami N., Hanifehpour Y., Samiei M., Kouhi M., Nejati-Koshki K., Liposome: classification, preparation, and applications. *Nanoscale Research Letters.* 2013; 8: 102-102.

Boomer J A, Qualls M M, Inerowicz H D, Haynes R H, Patri V S, Kim J M, Thompson D H. Cytoplasmic delivery of liposomal contents mediated by an acid-labile cholesterol-vinyl ether-PEG conjugate. *Bioconjug Chem.* 2009; 20: 47-59.

Carrington et al., Role of microRNAs in plant and animal development. *Science* 2003; 301 (5631): 336-8.

Csiszár A, Hersch N, Dieluweit S, Biehl R, Merkel R, Hoffmann B. Novel fusogenic liposomes for fluorescent cell labelling and membrane modification. *Bioconjugate Chem.* 2010; 21(3): 537-543.

Eckstein, Oligonucleotides and Analogues: A Practical Approach, Oxford University Press.

Hermanson, Bioconjugate Techniques 1996, Academic Press, Inc., San Diego.

Karanth H, Murthy Rs. pH-sensitive liposomes-principle and application in cancer therapy. *J Pharm Pharmacol.* 2007; 59: 469-483.

Kooijmans S. A. A.; Vader P.; van Dommelen S. M.; van Solinge W. W.; Schiffelers R. M., Exosome mimetics: a novel class of drug delivery systems. *International Journal of Nanomedicine.* 2012; 7: 1525-1541.

Marcos P. Achieving targeted and quantifiable alteration of mRNA splicing with Morpholino oligos. *Biochemical and Biophysical Research Communications.* 2007; 358: 521-527.

Marcus-Sakura C J., Techniques for using antisense oligodeoxyribonucleotides to study gene expression. *Anal. Biochem.* 1988; 172: 289.

Kunisawa J, Nakagawa S, Mayumi T. Pharmacotherapy by intracellular delivery of drugs using fusogenic liposomes: application to vaccine development. *Adv Drug Deliv Rev.* 2001; 52: 177-86.

Langer R., New methods of drug delivery. *Science.* 1990; 249: 1527-33.

Lieberman, Pharmaceutical Dosage Forms (vols. 1-3, 1992).

Lloyd, The Art, Science and Technology of Pharmaceutical Compounding (1999).

Nakanishi M, Mizuguchi H, Ashihara K, Senda T, Eguchi A, Watabe A, Nakanishi T, Kondo M, Nakagawa T, Masago A, Okabe J, Ueda S, Mayumi T, Hayakawa T. Gene delivery systems using the Sendai virus. *Mol Membr Biol.* 1999; 16: 123-127.

Pickar, Dosage Calculations (1999).

Remington *The Science and Practice of Pharmacy,* 19th ed., Mack Printing Company, Easton, Pennsylvania (1995).

Sanghui & Cook, eds. Eckstein, Oligonucleotides and Analogues: A Practical Approach, Oxford University Press.

Shim M S, Kwon Y J. Efficient and targeted delivery of siRNA in vivo. *FEBS J.* 2010; 277(23): 4814-4827.

Tan S.; Wu T.; Zhang D.; Zhang Z., Cell or Cell Membrane-Based Drug Delivery Systems. *Theranostics* 2015; 5 (8): 863-881.

Weintraub, *Scientific American.* 2003; 262: 40 (1990 Carrington et al., *Science* 301 (5631): 336-8.

Xu P.; Wang R.; Wang X.; Ouyang J., Recent advancements in erythrocytes, platelets, and albumin as delivery systems. *OncoTargets and therapy.* 2016; 9: 2873-2884.

The invention claimed is:

1. A composition comprising a cell ghost encapsulated by a multilamellar liposome, where said cell ghost has been emptied of all or substantially all of the cytosolic contents of the cell including the nucleus and nuclear contents and wherein said liposome has been formed by lipid thin film hydration, wherein upon processing of said composition by shearing, extrusion, or freeze thawing and sonicating, a biomolecular composite having a hydrodynamic diameter of less than 6 µm or in the range from about 5 µm to about 50 nm is formed by the fusion of the cell ghost and liposome, and
wherein said cell ghost comprises ligands suitable for targeting the biomolecular composite to a desired cell or tissue.

2. The composition of claim 1, wherein the cell ghost is:
(iii) derived from a cell selected from the group comprising monocytes, macrophages, T cells, B cells, Natural Killer cells, stem cells, nucleated red blood cells, adipose cells, foam cells and tumour cells, or
(iv) derived from a cell line selected from the group comprising RAW264.7 (mouse macrophage), HaCaT (human keratinocyte), HDF (human dermal fibroblast), U937 (human monocytes), Jurkat (human T cells), CT26 (mouse colon carcinoma), HeLa (human cervical cancer), HEK293 (human kidney epithelial), 3T3-L1 (mouse pre-adipocytes) and HMSC (human mesenchymal stem cells).

3. The composition of claim 1, wherein the composition further comprises a cargo molecule.

4. The composition of claim 3, wherein the cargo molecule is one or more of an imaging agent, a transfection reagent and a therapeutic agent.

5. The composition of claim 4, wherein the therapeutic agent is selected from the group consisting of analgesics, anaesthetics, analeptics, corticosteroids, anticholinergic agents, anticholinesterases, anticonvulsants, chemotherapeutic agents, allosteric inhibitors, anabolic steroids, ant rheumatic agents, psychotherapeutic agents, neural blocking agents, anti-inflammatory agents, anthelmintics, antibiotics, anticoagulants, antifungals, antihistamines, antimuscarinic agents, antimycobacterial agents, antiprotozoal agents, antiviral agents, dopaminergics, haematological agents, immunological agents, muscarinics, protease inhibitors, vitamins, growth factors and hormones.

6. The composition of claim 4, wherein the imaging agent is selected from the group consisting of radioactive isotopes, iron oxide nanoparticles, gold nanoparticles, fluorescent dyes and near-infra-red dyes.

7. A method for the treatment of a disease or condition in a patient in need of such treatment comprising administering to the patient an effective amount of the composition of claim 3, wherein said cargo molecule is a therapeutic agent for the treatment of said disease or condition.

8. A method for the diagnosis of a disease in a subject comprising administering to the subject the composition of claim 3, wherein said cargo molecule is an imaging agent, followed by imaging the subject.

9. A method of manufacturing a biomolecular composite comprising:
(a) providing the composition of claim 1; and
(b) fusing the multilamellar liposome with the cell ghost by shearing, extrusion, or by freeze thawing and sonicating the cell ghost, and the multilamellar liposome together, under conditions that effect a size reduction to a hydrodynamic diameter of less than 6 µm to about 50 nm.

10. The composition of claim 1, wherein the cell ghosts were produced from viable cells by a method comprising:
(a) providing a suspension of viable cells in an osmotically active solution that is hypotonic to the cell;
(b) gently agitating the hypotonic cell suspension for a period of time so that osmotic pressure renders the membrane permeable and contents of the cytosol and nucleus leak from the viable cells, thereby creating at least partially depleted cells;
(c) separating cellular debris including contents of the cytosol and nucleus from the at least partially depleted cells;
(d) repeating (b) and (c) if necessary until the at least partially depleted cells are depleted of contents of the cytosol and nucleus;
(e) suspending the depleted cells in an isotonic medium for a period of time to allow resealing of the cell membrane to produce cell ghosts;
(f) isolating the cell ghosts.

11. The method of manufacturing a biomolecular composite according to claim 9, wherein:
(c) said multilamellar liposome comprises labels or tags; and/or
(d) said cell ghost and/or said multilamellar liposome contains a cargo molecule; and/or
(e) said fusing is effected using techniques selected from the group comprising extrusion, passage through membrane pores, freeze thaw and sonication cycles.

12. The method of manufacturing a biomolecular composite according to claim 9, wherein:
(f) said multilamellar liposome comprises compounds selected from the group consisting of phospholipids, sphingolipids, ceramides and glycosphingolipids, and combinations thereof; and/or
(g) said multilamellar liposome comprises at least one fusogenic lipid and/or at least one fusogenic peptide wherein the fusogenic peptide is optionally Sendai virus fusion protein.

13. The method of manufacturing a biomolecular composite according to claim 12, wherein:
(a) the fusogenic lipid is selected from the group consisting of 1,2-dioleoyl-3-trimethylammonium-propane (DOTAP), 1,2-dipalmitoyl-sn-glycero-3-phosphocholine (DPPC), L-a-phosphatidylcholine (HSPC), (N-(1-(2, 3-dioleoyloxy) propy-1)-N,N,N-trimethylamine) (DOTMA) and (dimethyl-dioctadecyl-ammonium-bromide (DDAB), 1,2-dioleoyl-sn-glycero-3-phosphoethanolamine (DOPE), distearophosphoethanolamine polyethyleneglycol 2000 (DSPE-PEG2000), 1,2-distearoyl-sn-glycero-3-phosphoethanolamine-N-[amino (polyethylene glycol)-2000] (DSPE-PEG2000 Amine) and 1,2-distearoyl-sn-glycero-3-phosphoethanolamine-N-[biotinyl(polyethyleneglycol)-2000] (DSPE-PEG2000 Biotin), or combinations thereof and/or
(b) the multilamellar liposome further comprises a compound selected from the group consisting of saturated glycerides, steroids, synthetic phospholipids, triglycerides, waxes, terpenes, vitamins, modified lipids, or combinations thereof, wherein the modified lipids comprise biotin, avidin, streptavidin, azide groups, alkyne groups, polyethylene glycol chains, folate, fragments of other cell membranes from other cell types, peptides, enzymes, genetic material, labeled lipids, wherein the labeled lipids comprise a fluorescent label, a luminescent label, a bioluminescent label, a chemiluminescent label or a radioactive label, or combinations thereof.

14. The method of manufacturing a biomolecular composite according to claim 11, wherein passage through said membrane pores comprises
   (i) passage through a series of 10 μm and 8 μm membrane filters; and/or
   (ii) passage through a membrane filter having a pore size of from 3 to 10 μm.

15. The method of manufacturing a biomolecular composite according to claim 11, wherein the passage through membrane pores occurs from one to nine times.

\* \* \* \* \*